US008730639B1

(12) United States Patent
Wilson et al.

(10) Patent No.: US 8,730,639 B1
(45) Date of Patent: *May 20, 2014

(54) OVERVOLTAGE PROTECTION FOR REMOTE RADIO HEAD-BASED WIRELESS COMMUNICATION SYSTEMS

(75) Inventors: James Wilson, Post Falls, ID (US); Douglas Wayne Miller, Post Falls, ID (US)

(73) Assignee: Raycap, S.A., Athens (GR)

( * ) Notice: Subject to any disclaimer, the term of this patent is extended or adjusted under 35 U.S.C. 154(b) by 709 days.

This patent is subject to a terminal disclaimer.

(21) Appl. No.: 12/984,304

(22) Filed: Jan. 4, 2011

Related U.S. Application Data

(60) Provisional application No. 61/363,967, filed on Jul. 13, 2010.

(51) Int. Cl.
*H02H 1/04* (2006.01)

(52) U.S. Cl.
USPC .......................................................... 361/118

(58) Field of Classification Search
USPC ................................................. 361/119, 118
See application file for complete search history.

(56) References Cited

U.S. PATENT DOCUMENTS

| | | | | | |
|---|---|---|---|---|---|
| 3,165,372 | A | * | 1/1965 | Jacobs et al. | 439/709 |
| 3,976,351 | A | | 8/1976 | Hopfe | |
| 4,030,061 | A | | 6/1977 | Gaskell et al. | |
| 4,236,190 | A | * | 11/1980 | Hollingsead et al. | 361/725 |
| 4,918,565 | A | | 4/1990 | King | |
| 5,030,128 | A | | 7/1991 | Herron et al. | |
| 5,311,397 | A | * | 5/1994 | Harshberger et al. | 361/679.58 |
| D361,314 | S | | 8/1995 | Ryan | |
| D362,232 | S | | 9/1995 | Ryan | |
| 5,530,215 | A | | 6/1996 | Couvreur | |
| 5,602,532 | A | | 2/1997 | Ryan | |
| 5,651,698 | A | | 7/1997 | Locati et al. | |
| 5,701,227 | A | | 12/1997 | Ryan | |
| 5,790,360 | A | | 8/1998 | Ryan | |

(Continued)

FOREIGN PATENT DOCUMENTS

| | | |
|---|---|---|
| EP | 1855365 | 11/2007 |
| EP | 2005854158 | 11/2007 |

(Continued)

OTHER PUBLICATIONS

Stolowitz Ford Cowger LLP, Listing of Related Cases, Jul. 30, 2013.

(Continued)

*Primary Examiner* — Ronald W Leja
(74) *Attorney, Agent, or Firm* — Stolowitz Ford Cowger LLC

(57) ABSTRACT

A surge suppression system provides surge protection both locally within the radio station building were the power plant and telecommunication equipment are located and remotely next to the radios and antennas located outside of the building on the communication tower. An aerodynamically shaped remote surge suppression unit provides a waterproof enclosure for both surge suppression devices and fiber optic connectors. The unit has reduced wind load and reduced weight and can be placed on a wide variety of different radio tower and building structures with tight space restrictions. A rack mountable surge suppression unit provides local in-line surge suppression protection for the electrical equipment located in the communication station. A unique surge suppression tray is hot swappable so that multiple surge suppression devices can be replaced at the same time without disrupting radio operation.

18 Claims, 18 Drawing Sheets

(56) References Cited

U.S. PATENT DOCUMENTS

| | | | |
|---|---|---|---|
| 5,953,193 A | | 9/1999 | Ryan |
| 5,966,282 A | | 10/1999 | Ryan |
| 5,969,932 A | | 10/1999 | Ryan |
| 6,038,119 A | | 3/2000 | Atkins |
| 6,074,247 A | * | 6/2000 | Hall et al. .................... 439/532 |
| 6,430,020 B1 | | 8/2002 | Atkins |
| 6,535,369 B1 | | 3/2003 | Redding et al. |
| 6,556,402 B2 | | 4/2003 | Kizis |
| 6,623,315 B1 | | 9/2003 | Roderick |
| 6,719,615 B1 | | 4/2004 | Molnar |
| 6,851,966 B1 | | 2/2005 | Tomasino |
| 6,876,533 B1 | | 4/2005 | Ryan |
| 7,008,256 B2 | | 3/2006 | Poiraud |
| 7,035,073 B2 | | 4/2006 | Bennett et al. |
| 7,397,673 B1 | | 7/2008 | Wilson |
| 7,433,169 B2 | | 10/2008 | Kamel |
| 7,768,794 B1 | | 8/2010 | Wilson |
| 8,021,189 B2 | | 9/2011 | Zayas et al. |
| 2002/0055306 A1 | | 5/2002 | Jenks |
| 2002/0196593 A1 | | 12/2002 | Kizis |
| 2003/0027521 A1 | | 2/2003 | Yip et al. |
| 2003/0148668 A1 | * | 8/2003 | Lias et al. .................... 439/712 |
| 2004/0119386 A1 | * | 6/2004 | Guidez ...................... 312/265.1 |
| 2005/0042920 A1 | | 2/2005 | Poiraud |
| 2006/0139836 A1 | | 6/2006 | Anthony |
| 2006/0153362 A1 | | 7/2006 | Bloodworth et al. |
| 2007/0163801 A1 | * | 7/2007 | Coffey et al. ................ 174/250 |
| 2008/0037188 A1 | | 2/2008 | Wilson |
| 2008/0117555 A1 | | 5/2008 | Wilson |
| 2008/0139045 A1 | | 6/2008 | Ho |
| 2008/0186667 A1 | | 8/2008 | Verdiell et al. |
| 2008/0278889 A1 | * | 11/2008 | Briggs et al. ................. 361/608 |
| 2008/0310060 A1 | * | 12/2008 | Metral et al. .................... 361/56 |
| 2009/0103218 A1 | | 4/2009 | Ryan |
| 2012/0092835 A1 | | 4/2012 | Miller |
| 2012/0200978 A1 | | 8/2012 | Miller |
| 2012/0200979 A1 | | 8/2012 | Miller |

FOREIGN PATENT DOCUMENTS

| | | |
|---|---|---|
| JP | 2005317472 | 12/2002 |
| WO | W02006076120 | 7/2006 |
| WO | 2012/108929 | 8/2012 |
| WO | 2012/108930 | 8/2012 |

OTHER PUBLICATIONS

Written Opinion for PCT/US11/064704; Date of mailing: May 16, 2012.
Written Opinion for PCT/US11/064717; Date of mailing: May 16, 2012.
International Search Report for PCT/US11/064704; Date of mailing: May 16, 2012.
International Search Report for PCT/US11/064717: Date of mailing: May 16, 2012.
Stolowitz Ford Cowger LLP, Listing of Related Cases, Aug. 9, 2012.
Preliminary Report on Patentablity and Written Opinion of the International Searching Authority for PCT/US2011/064717; Date of mailing Aug. 13, 2013.
Preliminary Report on Patentablity and Written Opinion of the International Searching Authority for PCT/US2011/064704; Date of mailing Aug. 13, 2013.
Stolowitz Ford Cowger LLP, Listing of Related Cases, May 30, 2011.
“Relay” from Wikipedia. Downloaded Oct. 30, 2009.

* cited by examiner

OVERVOLTAGE PROTECTION FOR REMOTE RADIO HEAD-BASED WIRELESS COMMUNICATION SYSTEMS

The present application claims priority to U.S. Provisional Application Ser. No. 61/363,967 which is herein incorporated by reference in its entirety.

BACKGROUND

Until recently, most wireless communications sites included radio systems that were located on the ground level in a building, cabinet or other shelter. The DC power supply, baseband controller, amplifiers and radios were historically located in one location within the shelter. From this location, coaxial cable was run from the radios to antennas that were supported on a tower outside the building. Equipment installed in this manner is susceptible to lightning strike damage either due to lightning strikes directly hitting the antennas or from induced energy from the tower structure. Coaxial lightning protectors are commonly used to protect the antennas on the tower and radios on the ground. The DC power plant is somewhat isolated from direct lightning events, due to the radios, other dc-powered equipment and grounding obstructing the path of the lightning strike to earth.

Latest generation wireless communications systems, referred to as distributed antenna systems (DAS), distributed DC radio systems, remote radio heads (RRH), 4G and long term evolution (LTE) cellular communication systems, now commonly locate the radios next to the antennas on the tower outside of the communications shelter. In these next-generation facilities, the baseband system module that controls the radio traffic is still located at the ground level shelter, but the actual radios are separated from the controllers up to several hundred feet and controlled by fiber optic links. The radios are powered directly by DC feeds from the DC power plant that extend up the tower and to the radios. In some cases, the DC cables and fiber optic cables are run separately up the tower and in other cases they are all bundled together in one large hybrid cable.

The radios located outside of the communications shelter on top of the tower are much more susceptible to damage from lighting strikes and other electrical power surge events. Individual power lines are run to each individual radio also increasing the amount of power cabling exposed to power surge events. Thus, the DC power plant and telecommunication equipment at communication stations with distributed power have more risk of being damaged due to direct lighting strikes and power surges.

Overview

A surge suppression system provides more effective protection for communication stations with distributed radio and power systems. The surge suppression system provides surge protection both locally within the radio station building where the power plant and telecommunication equipment are located and remotely next to the radios and antennas located outside of the building on the communication tower. A dome shaped external surge suppression unit provides a waterproof enclosure for both surge suppression devices and fiber optic connectors. The dome shaped unit has reduced wind load and reduced weight and can be placed on a wide variety of different radio tower and building structures with tight space restrictions. A unique mounting structure within the suppression unit can retain a large number of surge suppression devices and a large number of fiber optic cable connectors in a relatively small form factor. The mounting structure in the dome surge suppression unit also simplifies installation and maintenance of surge suppression units and fiber optic cables.

A second rack mountable surge suppression unit provides local in-line surge suppression protection for the electrical equipment located in the communication station. A unique surge suppression tray is hot swappable so that multiple surge suppression devices can be replaced at the same time without disrupting radio operation. A power terminal assembly in the rack mountable surge suppression unit provides a common relatively short in-line contact point between the surge suppression devices in the tray and different power cables that are distributed out to the different radios.

A unique pluggable interface between the surge suppression tray and the power terminal assembly allows all of the surge suppression devices to be insertably attached to all of the power cables at the same time. Unique surge suppression module configurations within the tray couple multiple surge suppression devices together and allow the modules to be quickly installed in or removed from the tray for different surge protection configurations.

DETAILED DESCRIPTION

Several preferred examples of the present application will now be described with reference to the accompanying drawings. Various other examples of the invention are also possible and practical. This application may be exemplified in many different forms and should not be construed as being limited to the examples set forth herein.

Figure 1:
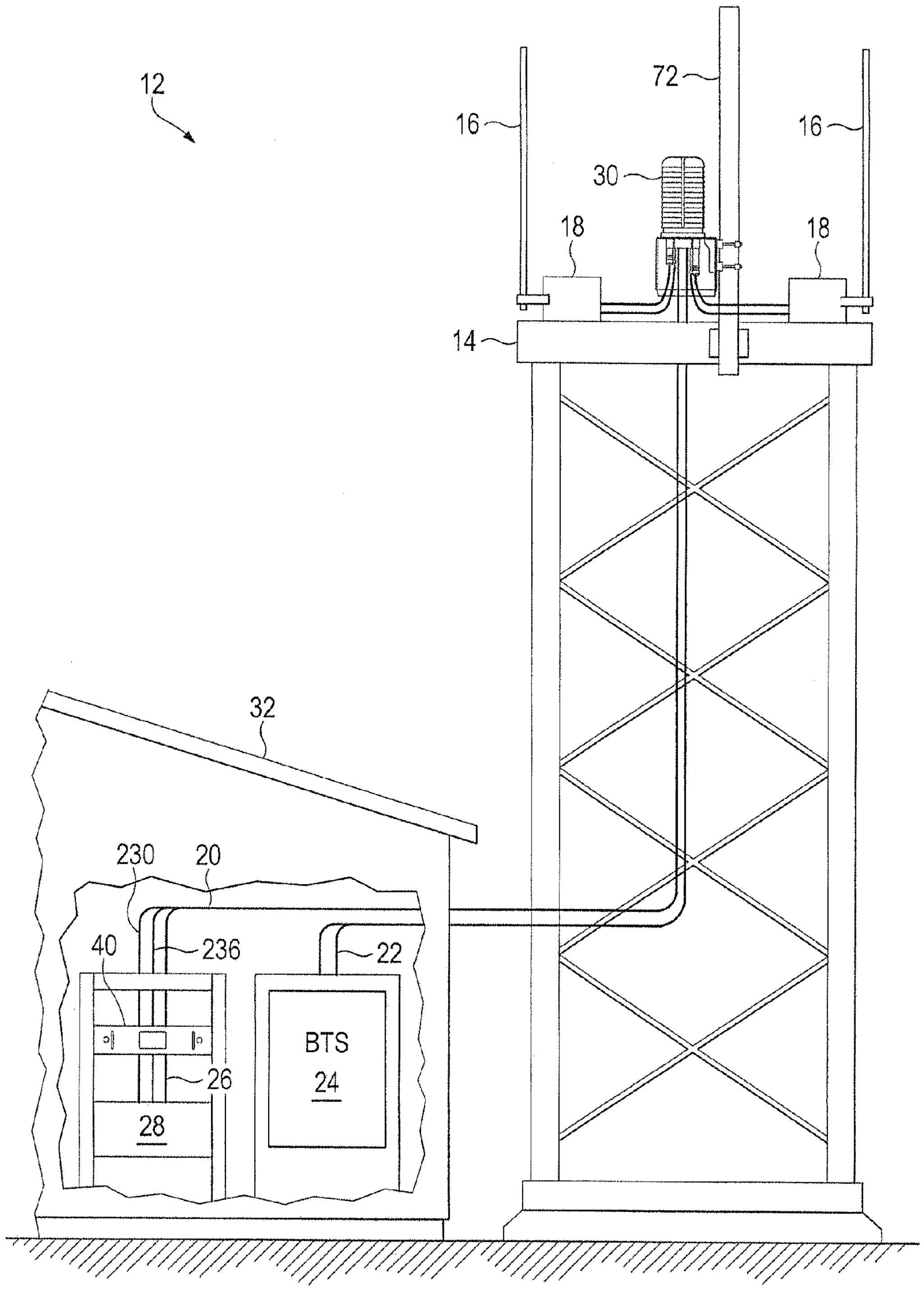
FIG. 1 shows a surge suppression system for a remote radio head-based wireless communication system.
Figure 2:
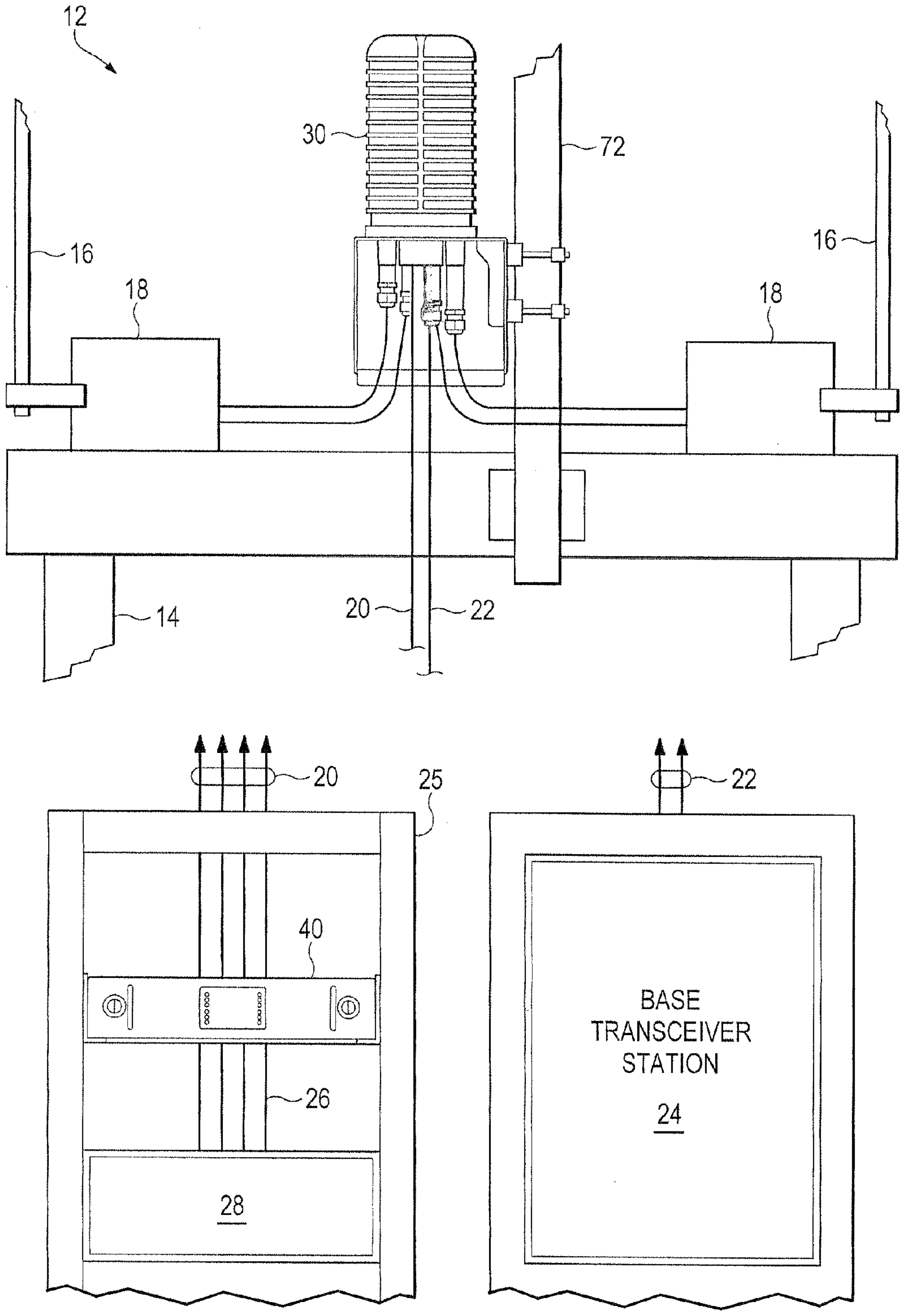
FIG. 2 shows the surge suppression system of FIG. 1 in more detail.

FIG. 1 illustrates one example of a surge suppression system 12 that provides surge suppression for a distributed wireless communication station. FIG. 2 shows some of the elements of the surge suppression system of FIG. 1 in more detail. Referring both to FIGS. 1 and 2, a building 32 contains computing equipment for a base transceiver station (BTS) 24. The communication station 24 is connected through fiber optic cables 22 to different radios 18 located on the top of a tower 14. A Direct Current (DC) power plant 28 is connected through a DC power bus 26 and DC power cables 20 to the different radios 18 on tower 14. The power bus 26 includes pairs of power cables 230 and 236 that are described in more detail below. The power cables 20 include sets of −48 DC volt power lines, return lines, and associated ground lines that extend out of the building 32 and run up the tower 14 to different associated radios 18. The radios 18 are connected to associated antennas 16.

This is just one example of a distributed communication system that uses the surge suppression system 12. It should be understood that the surge suppression system 12 can be used with any communication system or any other electrical system that may require overvoltage protection.

A dome shaped surge suppression unit 30 is attached to a support 72 on the top of the tower 14 and is connected to the ends of the power cables 20 proximate to the radios 18 and antennas 16. In one embodiment, the surge suppression unit 30 is ideally located within 2 meters of the radios 18. A rack based surge suppression unit 40 is located inside of the building 32 and is connected to the opposite end of the power cables 20 relatively close to the DC power plant 28 and communication station 24. In one embodiment, the surge suppression unit 40 is located in a rack 25 that also contains the DC power plant 28. In an alternative embodiment, the surge suppression unit 40 is located in another rack or some other location next to power plant 28.

The radios 18 can be located outside of the building 32 at the bottom of the tower 14. In this arrangement, the surge suppression unit 40 may still be located in the rack 25. However, the surge suppression unit 30 may or may not be used for connecting to the opposite ends of the power cables 20 outside of the building 32.

In another communication station configuration, the radios 18 and associated antennas 16 are located at different corners on the roof of a building. Individual surge suppression boxes can be connected to individual power lines 20 close to the different radios 18 on the roof of the building. Each of the boxes may contain surge suppression devices for one or a few power cables and associated radios. In this configuration the surge suppression unit 40 may still be used but surge suppression boxes located on the roof may be configured differently than the dome shaped surge suppression units 30 shown in FIGS. 1 and 2.

In another configuration the radios 18 and antennas 16 are again located at different corners on a roof of a building. The power cables 20 and fiber optic cables 22 are run into the building and connected to the power plant 28 and communication station 24, respectively, located within a room of the building. In one embodiment, individual surge suppression boxes are connected to the individual power cables 20 and located next to the associated radios 18 on the roof of the building. A separate fiber/power connector on the top of the building provides a junction between the power lines 20 and fiber optic cables 22 extending inside the building and jumper cables that connect to the radios 18.

In another embodiment where the different radios 18 are located relatively close to each other, the dome shaped surge suppression unit 30 may be used both for containing surge suppression devices and as the junction box for the fiber optic cable jumpers that are distributed out to the radios 18. In another embodiment, the dome shaped enclosure of unit 30 may only be used as a junction box for the power cables 20 and/or fiber optic cables 22. The same rack mountable surge suppression unit 40 may be located in the building 32 and may have a same or different surge suppression configuration than the configurations shown in FIGS. 1 and 2.

External Surge Suppression Unit

Figure 3:
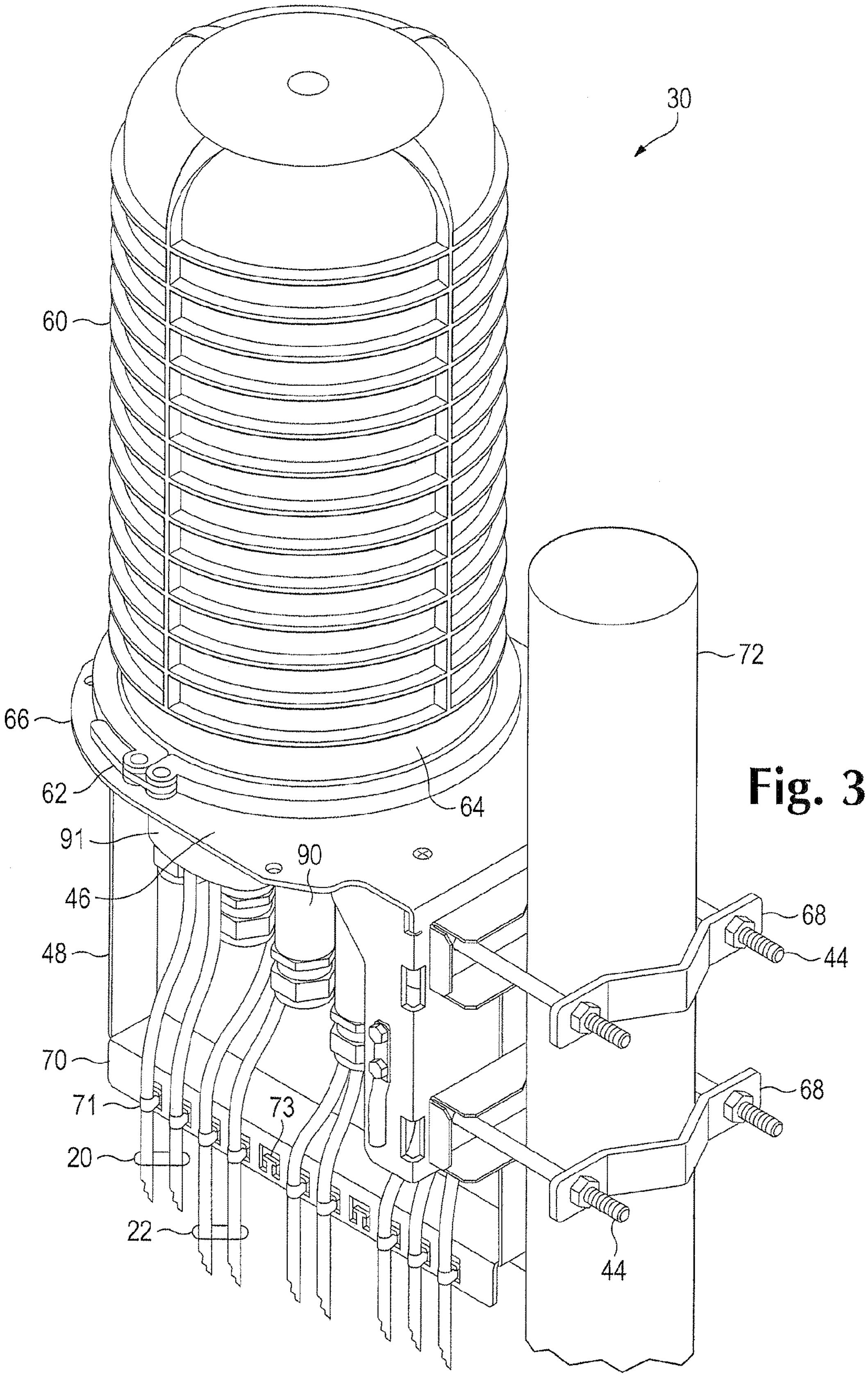
FIG. 3 shows a dome shaped surge suppression unit used in the surge suppression system of FIG. 1.

FIG. 3 shows in more detail the surge suppression unit 30 previously shown in FIGS. 1 and 2. A dome shaped plastic lid 60 sits over a base unit 64 that is shown in more detail in FIGS. 4-6. A ring clamp 62 provides a weather tight seal between the lid 60 and the base unit 64. In one embodiment, the entire suppression unit 30 is around 24 inches or 610 millimeters (mm) tall and has a diameter of around 11 inches or around 280 mm. Of course the suppression unit 30 can be other dimensions according to different surge suppression requirements.

The top of radio towers have strict wind load, weight, and space limitations. The aerodynamic cylindrical shape of the dome lid 60 reduces wind load that the suppression unit 30 applies to tower 18 in FIG. 1. However, the lid 60 could also have other shapes such as an oval, rounded edge square, triangle, or any other shape that has relatively low wind resistance.

The lid 60 is vertically elongated to increase the amount of internal space available for containing surge suppression devices and fiber optic connectors. The surge suppression unit 30 also has a relatively small diameter to conserve space and further reduce wind load at the top of tower 14. In other embodiments where more space is available, the lid 60 may be shorter and have a larger diameter.

A mounting bracket 66 includes clamps 68 that attached to the support pole 72. The clamps 68 hold the mounting bracket 66 perpendicularly out from the side of the pole 72 on the tower 14 in FIG. 1. The bracket 66 has a mounting platform 46 with a circular ring shape that forms a circular internal opening 67 (FIG. 4) for receiving the circular base unit 64. A wiring bracket 70 extends underneath the mounting platform 46. Tie downs 71 are inserted into holes 73 in the wiring bracket 70 and used for securing the power cables 20 and fiber optic cables 22 that extend down from the bottom of base unit 64. Alternatively, the mounting bracket 66 could attach to a wall bracket or to a pole that extends up from the top of a roof. The mounting bracket 66 allows the surge suppression unit 30 to be mounted in a vertical elevated position in a large number of different support structures.

Figure 4:
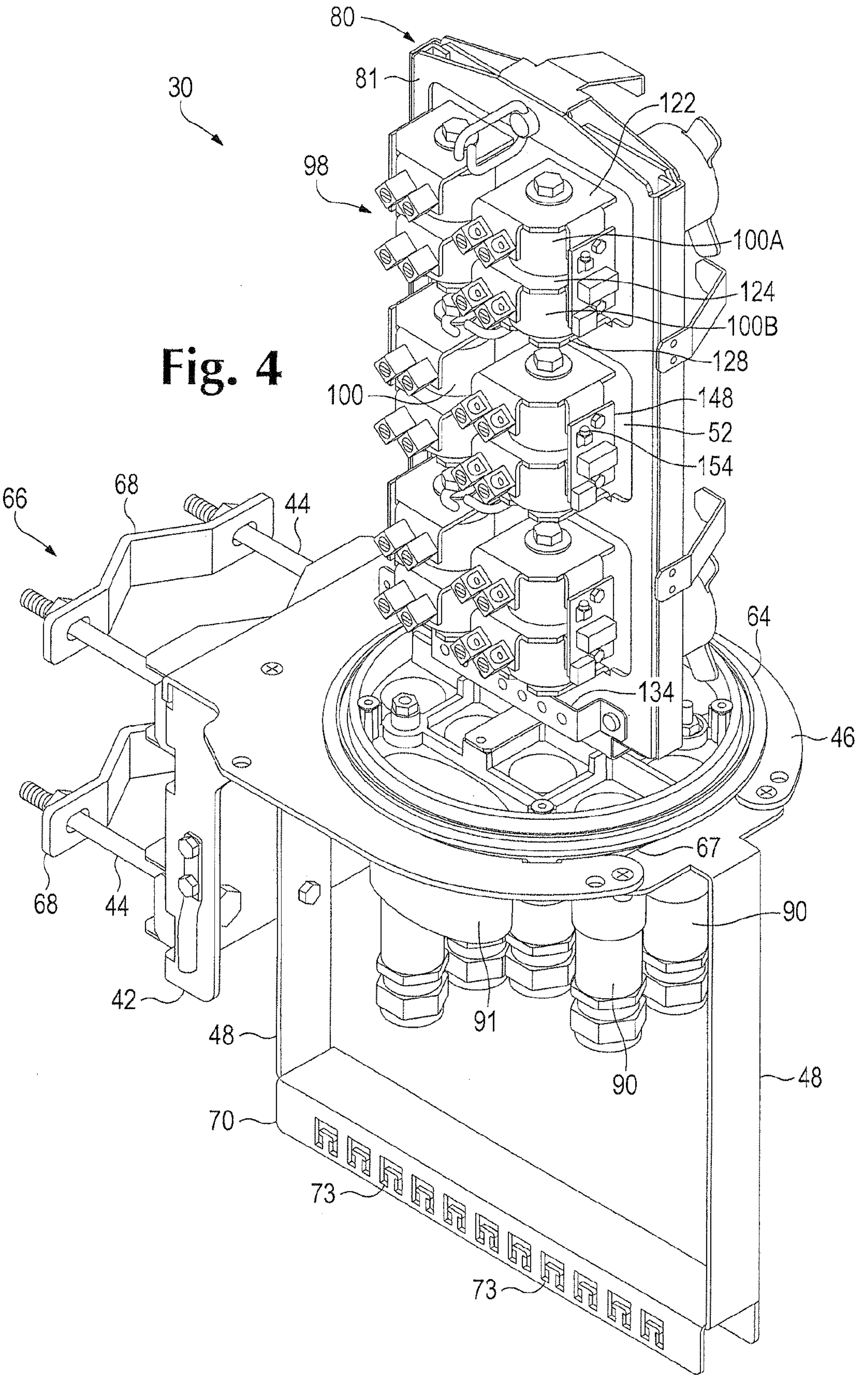
FIG. 4 shows the surge suppression unit of FIG. 3 with a lid removed.

FIG. 4 is a perspective view of the surge suppression unit 30 with the lid 60 removed. The two clamps 68 of mounting bracket 66 attach through bolts 44 to a back plate 42. The back plate 42 is aligned vertically and the mounting platform 46 extends horizontally out from the top of back plate 42. At mentioned above, the ring formed by mounting platform 46 forms a partial circular opening 67 that receives the base unit 64. Two vertical arms 48 extend between opposite ends of the mounting platform 46 and opposite ends of the wiring bracket 70.

Figure 5:
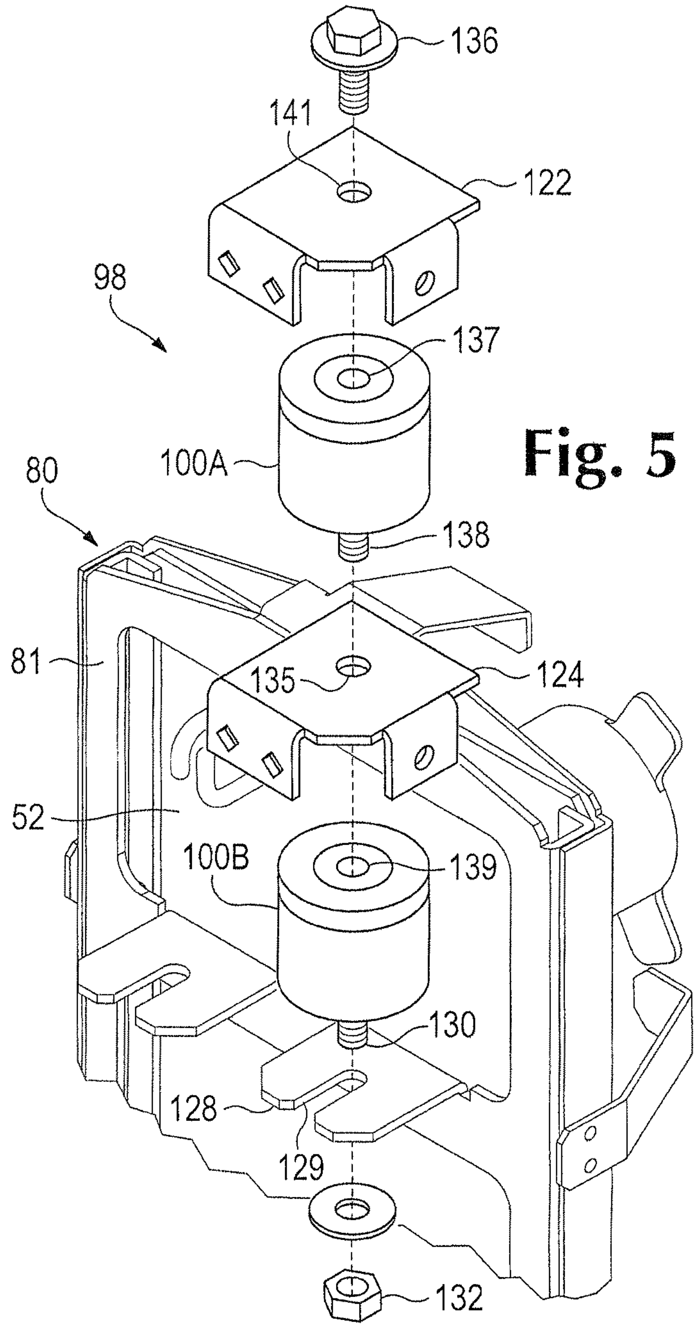
FIG. 5 shows a portion of a surge suppression assembly contained in the surge suppression unit of FIG. 4.

FIG. 5 is an exploded view showing one of multiple surge suppression assemblies 98 located inside of the surge suppression unit 30. Referring to FIGS. 4 and 5, a wall divider 80 extends vertically up from the middle of base unit 64 and forms two different chambers inside of the lid 60. Two columns of three surge suppression assemblies 98 are aligned vertically and in parallel next to each other on the power side of the divider wall 80. Each surge assembly 98 includes a set of three bus bars 122, 124 and 128 connected to a pair of vertically stacked surge suppression devices 100A and 100B. In one embodiment, the surge suppression devices 100A and 100B have a cylindrical disc shaped. One example of the surge suppression devices 100 is the Strikesorb® surge suppression module manufactured by Raycap Corporation, 151 24 Marousi, Athens Greece. However, any type and shape of surge suppression device 100 can be used and the bus bars 122, 124, and 128 can be configured to connect together other types and shapes of surge suppression devices.

Figure 6:
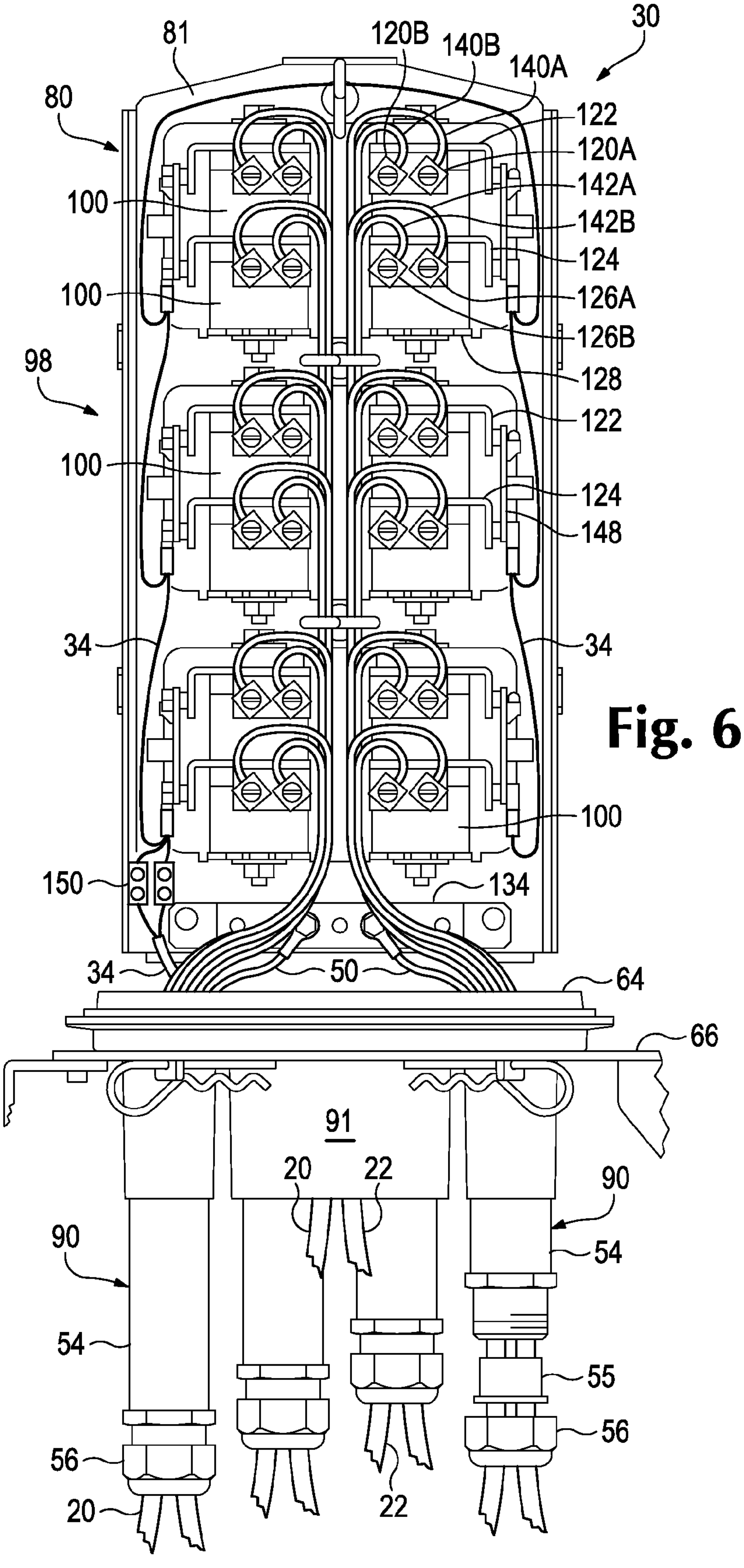
FIG. 6 is a front view of the surge suppression unit of FIG. 3 with the lid removed.

A ground terminal 134 connects to ground lines 50 in the power cables 20 (see FIG. 6). The ground terminal 134 is electrically coupled to an aluminum ground plate 81 that forms part of the wall divider 80. The ground plate 81 includes three pairs of tabs that extend up from the bottom of three rectangular openings 52. The tabs are bent 90 degrees into a horizontal position to form the ground bus bars 128 of the surge suppression assemblies 98. The ground plate 81 electrically couples together all the ground bus bars 128 and ground cables 50. This unique grounding configuration reduces the number of ground wires and other components used in the surge suppression unit 30.

The ground bus bars 128 operate as support platforms or shelves for the surge suppression assemblies 98 and allow the different components of the surge suppression assemblies 98 to be easily added or removed from the surge suppression unit 30. Each bus bar 128 extends horizontally and perpendicularly out from the side of the ground plate 81 and supports a pair of surge suppression devices 100A and 100B in a vertical stacked alignment. A bolt or screw 130 extends out of the bottom end of surge suppression device 100B and slides into a slot 129 formed in the bus bar 128. A nut 132 engages with a threaded end of bolt 130 mechanically and electrically coupling the bottom end of surge suppression device 100B to the bus bar 128.

A bottom end of surge suppression device 110A and a top end of surge suppression device 100B each include holes 139 that receive a threaded bolt or screw 138. The bolt 138 inserts through a hole 135 in return bus bar 124 and mechanically and electrically couple the bottom end of surge suppression device 110A and the top end of surge suppression device 100B to return bus bar 124. A bolt or screw 136 inserts through a hole 141 in bus bar 122 and screws into a hole 137 in the top of the surge suppression device 100A electrically and mechanically coupling a top end of the surge suppression device 100A to the bus bar 122.

FIG. 6 is a side elevation view of the suppression unit 30 with the lid 60 removed. A first terminal 120A on the bus bar 122 is connected to a −48 VDC power line 140A contained in one of the power cables 20 that connect to the power plant 28 in FIG. 1. A second terminal 120B on bus bar 122 is connected to a second −48 VDC jumper power line 140B that connects to one of the radios 18 in FIG. 1. A first terminal 126A on the return bus bar 124 connects to a positive or return power line 142A that is also connected at the other end to the power plant 28 in FIG. 1. A second terminal 126B on return bus bar 124 is connected to a positive/return jumper power line 142B that connects to the same radio 18 connected to line 140B.

The unique arrangement of the vertically elongated ground plate 81 and the horizontally extending ground bus bars 128 allow multiple pairs of the surge suppression devices 100 to be supported vertically on top of each other in two columns. This compact design allows all of the surge suppression components to be supported on a single side of the divider wall 80 and only extend out from the ground plate 81 little more than the width of the surge suppression devices 100.

Pairs of surge suppression devices 100A and 100B are readily accessible and easily removed and replaced by simply disconnecting the power lines 140 and 142 from the terminals 120 and 126, respectively. The bottom surge suppression device 100B can then be removed from ground bus bar 128. As mentioned above, the surge suppression devices 100A and 100B are aligned vertically one deep on divider wall 80 in two vertically aligned columns. This allows any individual surge suppression device 100, or any suppression assembly 98, to be easily replaced without obstruction by any other surge suppression devices 100. The surge suppression devices 110 and assemblies 98 can also be removed without disrupting operation of any other surge suppression assemblies 98. This easy accessibility is beneficial when maintenance operations are performed on the top of a tower 14 in FIG. 1 by technicians with limited mobility.

Ports 90 and 91 extend down from the bottom of the base unit 64. The ports 90 and 91 receive the different power cables 20 and fiber optic cables 22 from the power plant 28, communication station 24, and radios 18 shown in FIG. 1. In one embodiment, the ports 90 comprise conduits 54 made from a semi-flexible polyvinyl chloride (PVC) pipe. The different lengths of conduit 54 allow a larger number of ports 90 to extend out of the bottom of the circular base unit 64 and also allow relatively easy access by a technician. For example, the variable lengths allow a technician to more easily insert the cables 20 and 22 into the ports 90 and attach caps 56 onto the end of conduits 54. The elongated ports 90 also provide a long barrier zone between the internal cambers of the suppression unit 30 and the outside environment.

Each of the ports 90 has a circular cross sectional shape and contains a gasket 55 that receives the power cables 20 or fiber optic cables 22. The cables 20 or 22 are inserted along with the gasket 55 into the ports 90 and are then screwed tight inside of the conduits 54 by the caps 56. One of the ports 90 may receive an alarm monitoring cable 34. Other ports 91 have an oval cross-section shape and also extend down on opposite sides of the base unit 64 and receive some of the power cables 20 and/or fiber optic cables 22.

The suppression unit 30 has enough ports 90 and 91 to receive six different sets of power cables 20 for powering six different radios 18. In one embodiment there are two rows of four ports 90 that extend down from base unit 64 on opposite sides of the divider wall 80. There are also two oval ports 91 that extend down from the base unit 64 from opposite sides of the divider wall 80. However, any combination of ports 90 and 91 could be provided and any of the unused ports can be covered a waterproof cap 56 until needed.

FIGS. 4 and 6 also show monitoring devices 148 coupled between the two bus bars 122 and 124. The monitoring devices 148 activate a switch when the surge suppression device 100A is shorted to ground or otherwise fails. The monitoring devices 148 are daisy chained together by cable 34 and attach to alarm terminals 150 at the bottom of the ground plate 81. Individual LEDs 154 on each of the monitoring devices 148 allow a technician to determine which pairs of surge suppression devices 100A and 100B are functional. The wires in the alarm monitoring cable 34 are run from terminal 150 either back to an annunciation device in building 32 in FIG. 1 or to one of the radios 18 that can then send a signal back over one of the fiber optic cables 22 to a monitoring system.

Figure 7:
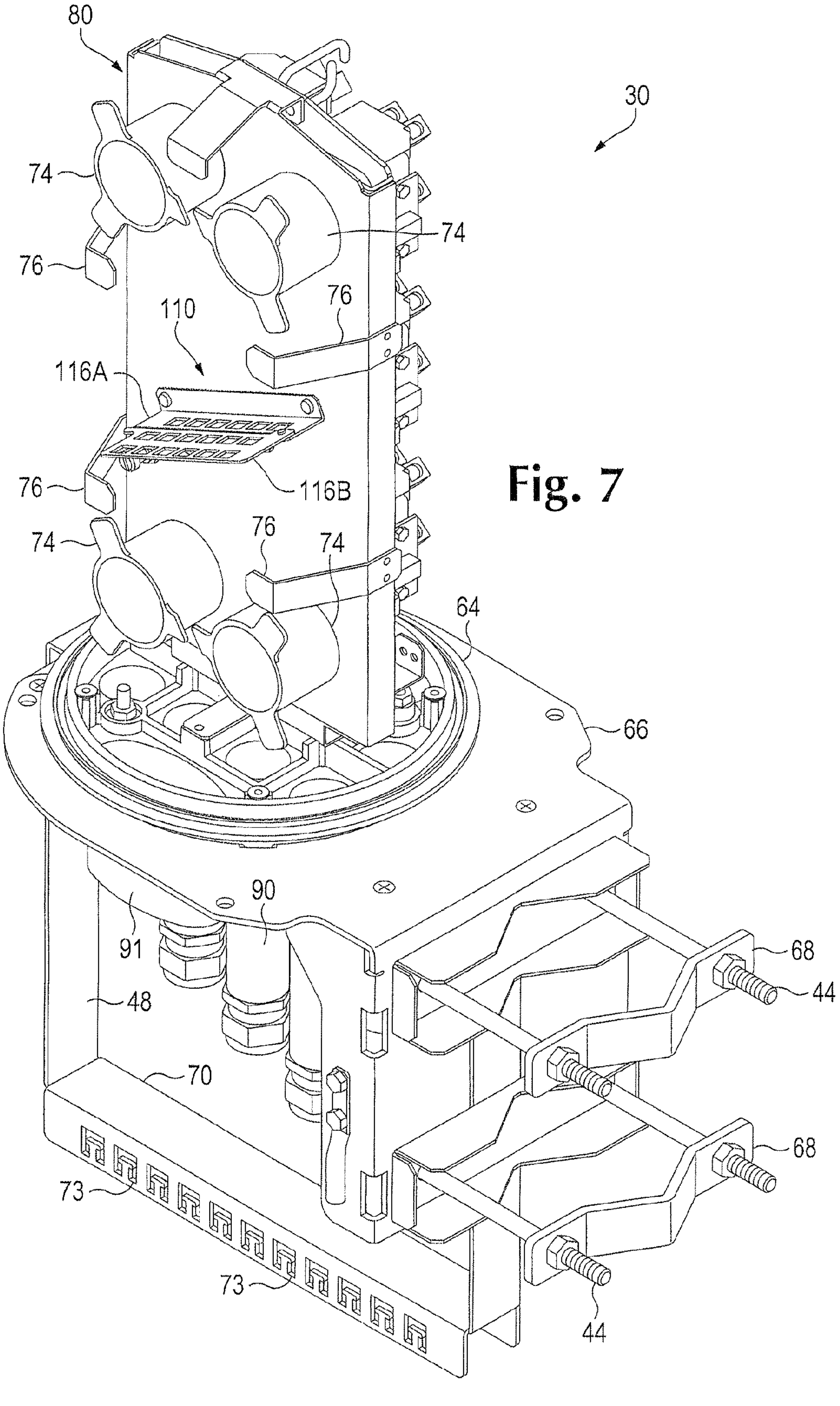
FIG. 7 is a perspective rear view of the surge suppression unit of FIG. 6.
Figure 8:
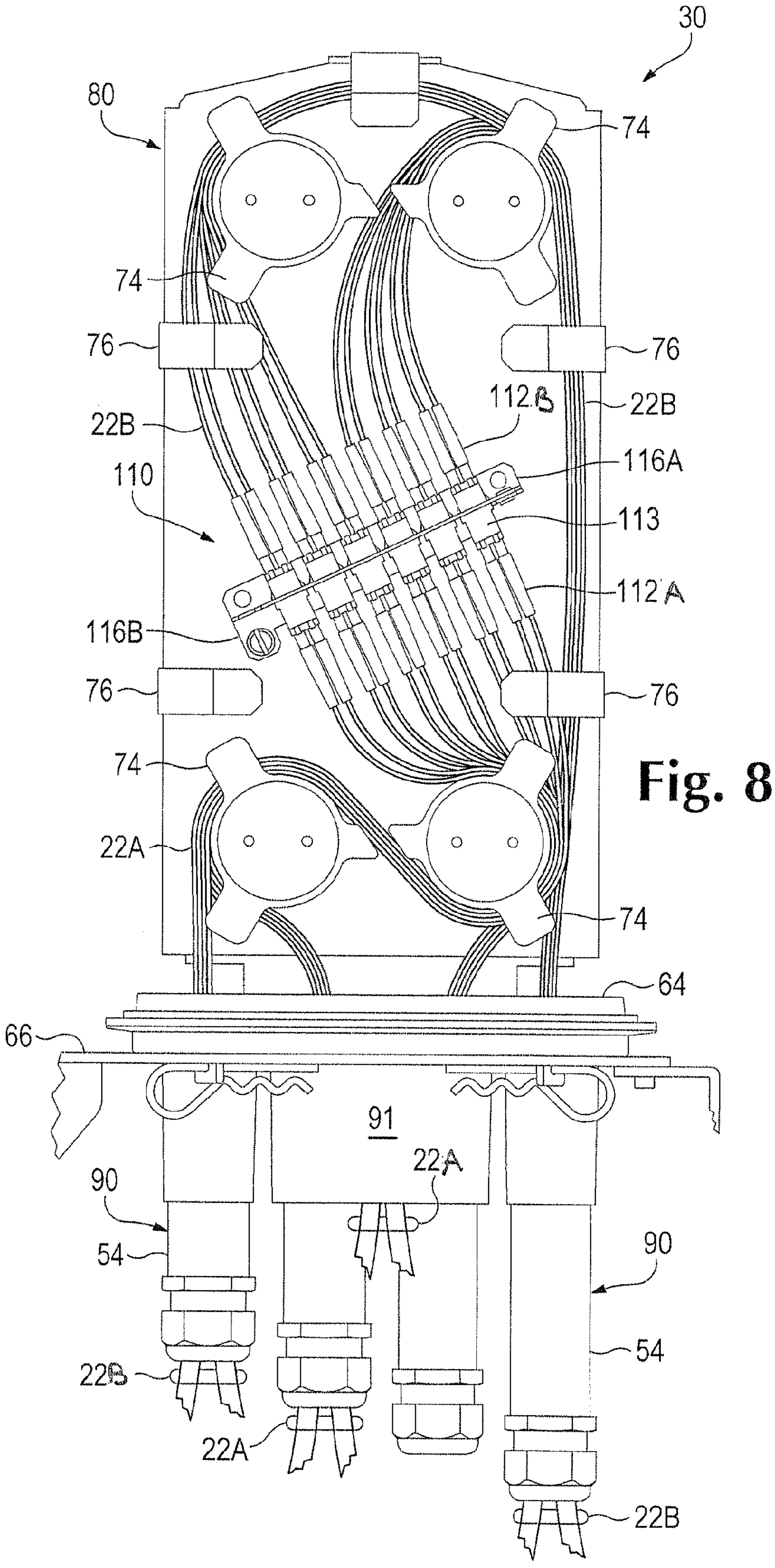
FIG. 8 is a rear elevation view of the surge suppression unit of FIG. 7.

FIG. 7 is a perspective view of the of the suppression unit 30 showing the fiber side of the divider wall 80. FIG. 8 shows the fiber side of the divider wall 80 populated with fiber optic cables 22A and 22B. Referring to FIGS. 7 and 8, the fiber optic cables 22A from the communication station 24 in FIG. 1 extend up through one of the ports 90 or 91 and the base unit 64. The fiber optic cables 22A wrap partially around one or more of spools 74. Connectors 112A at the end of the cables 22A snap into a first end of adapters 113 that are held in a connector tray 110.

Connectors 112B on a first end of fiber optic jumper cables 22B snap into a second end of the adapters 113 that are contained on connector tray 110. The fiber optic jumper cables 22B extend from connectors 112B around one or more of the spools 74, down through the bottom of base unit 64 and through another port 90 or 91, and connect to one of the radios 18 in FIG. 1. The spools 74 relieve some of the pressure on the fiber optic cables 22 and are also used to take up extra cable length. Retainers 76 hold the fiber optic cables within the fiber side of divider wall 80.

Figure 10:
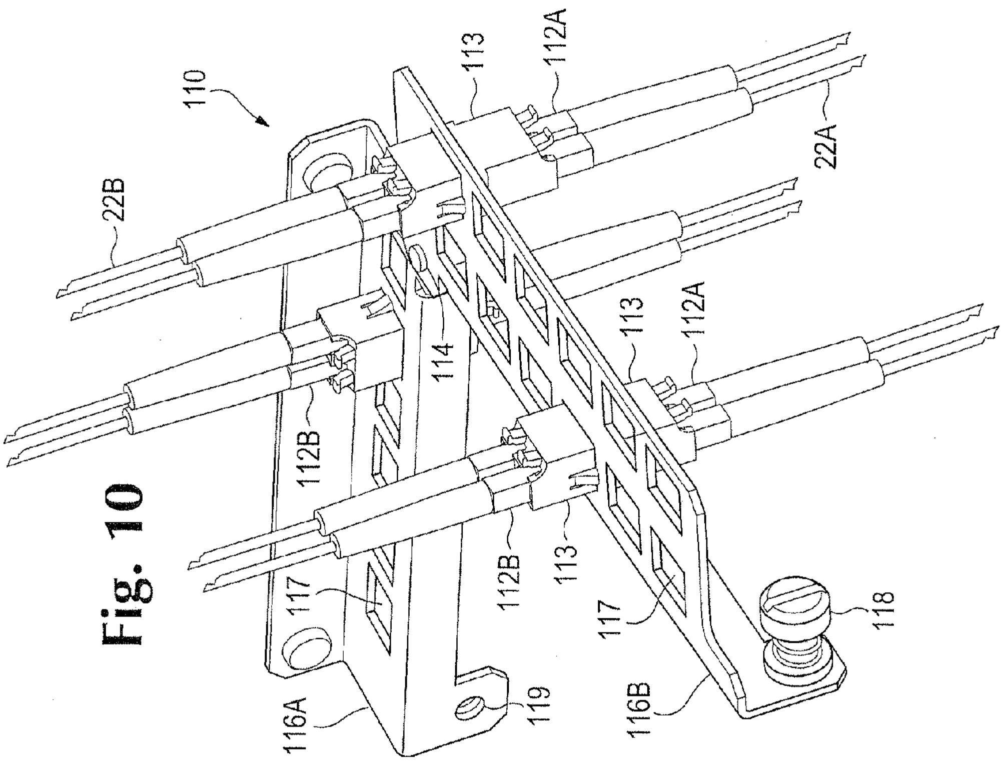
FIGS. 9 and 10 show a fiber optic cable tray in more detail.
Figure 9:
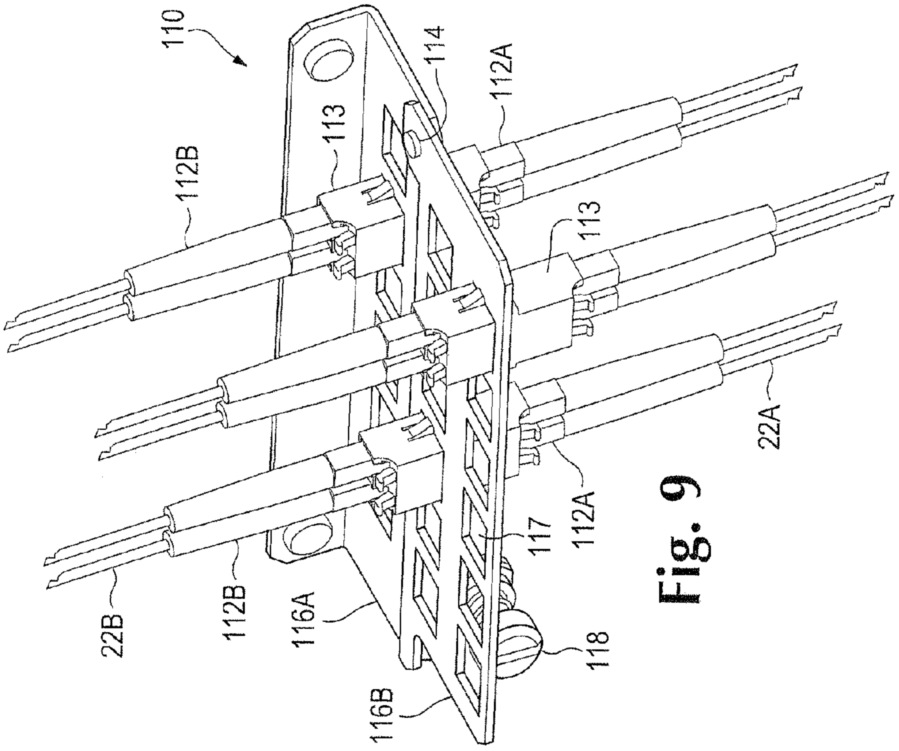

FIGS. 9 and 10 show the connector tray 110 in more detail. The adapters 113 seat into holes 117 located in two different arms 116A and 116B of the connector tray 110. The first arm 116A of the tray 110 is rigidly attached to the fiber side of the divider wall 80. The second arm 116B of the tray 110 rotates about a pin 114 that is rigidly attached to the lateral end of the first arm 116A. The second arm 116B can be rotated out in a 90 degree perpendicular relationship from the first arm 116A.

After installation of the fiber optic connectors 112A and 112B into opposite ends of the adapters 113, arm 116B is rotated about pin 114 into a parallel abutted alignment with arm 116A. A threaded screw or latch 118 is attached to the end of arm 116B and inserts and locks into a hole 119 on the lateral end of arm 116A.

The connector tray 110 when in the unlocked 90 degree position in FIG. 10 allows a technician to more easily install and maintain the fiber optic cables 22. In the locked position of FIG. 9, the arms 116A and 116B abut lengthwise against each other to reduce the overall distance the tray 110 extends out from divider wall 80. In the folded latched position, the tray 110 extends only a small distance out from divider wall 80. This allows the dome shaped lid 60 in FIG. 3 to have a smaller diameter. Thus, the surge suppression unit 30 can retain a large number of fiber optic cable connectors 112 in a relatively small tubular footprint.

The connector tray 110 is shown with three parallel rows of holes 117 for retaining the adapters 113. However the tray 110 could have fewer rows or more rows of holes 117 for retaining fewer or more fiber optic cables 22. The fiber optic cables 22 can be installed in the connector tray 110 during initial installation of the suppression unit 30 on the tower 14 in FIG. 1 and used later as back-up or when additional radios 18 are installed.

Technicians can install the fiber optic jumper cables 22B and the power jumper cables 140B and 142B (FIG. 6) when the suppression unit 30 is initially installed on the tower 14 even before the radios 18 are installed. The technician can then climb up the tower 14 at a later time and attach the previously installed fiber optic jumper cables 22B and power jumper cables 140B and 142B in the suppression unit 30 to different radios 18.

In an alternative embodiment, both sides of the divider wall 80 are configured to support and connect surge suppression assemblies 98 similar to what is shown in FIG. 6. In this configuration the surge suppression unit 30 contains up to twelve surge suppression assemblies 98 for attaching to twelve different power cables 20. In another alternative embodiment, both sides of the divider wall 80 are configured to support and connect fiber optic cables 22 similar to what is shown in FIG. 8. In this configuration each side of wall 80 retains a fiber optic connector tray 110.

Rack Mounted Surge Suppression

Figure 11:
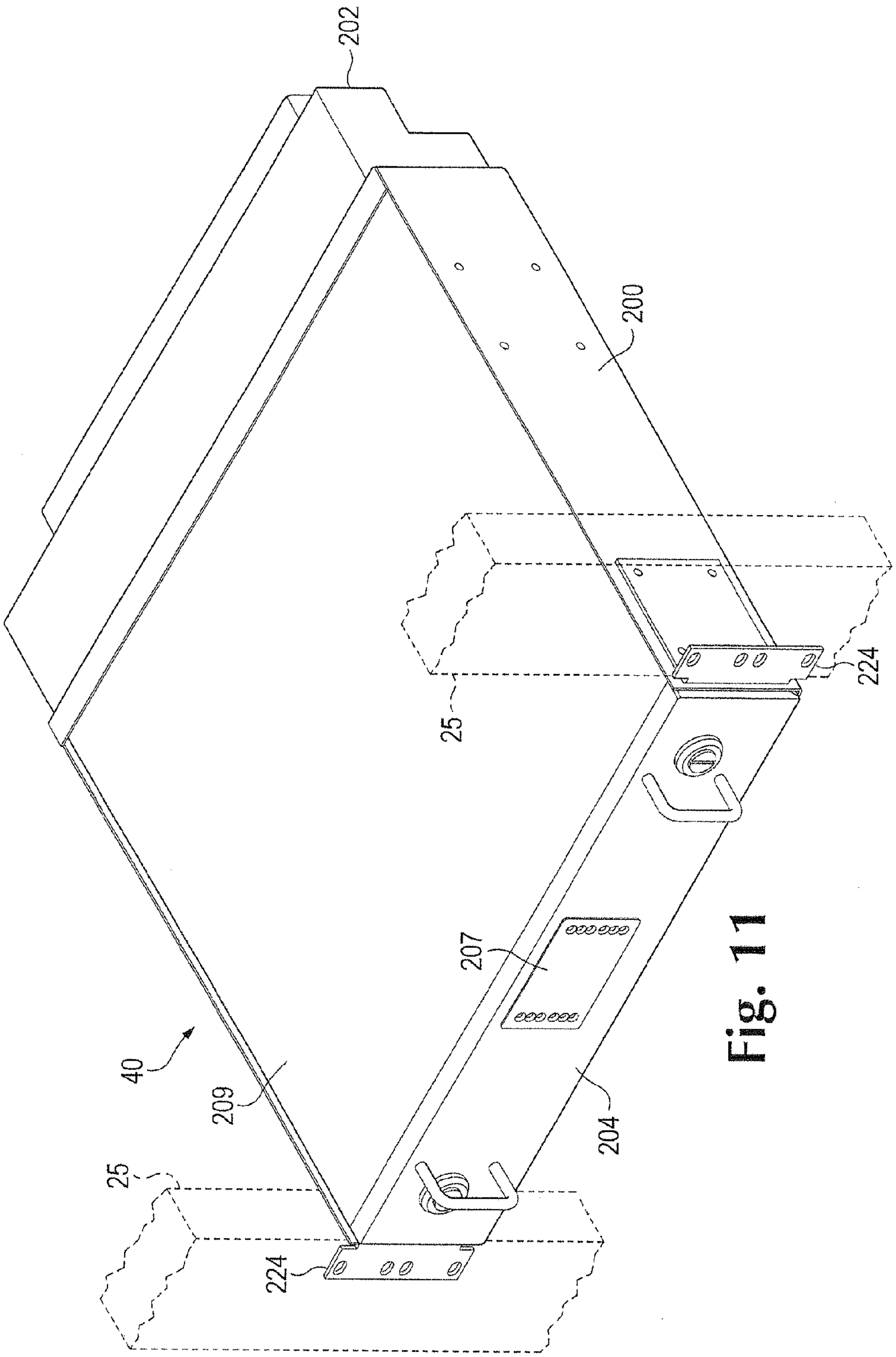
FIG. 11 shows a rack mountable surge suppression unit from FIG. 1 in more detail.

FIG. 11 shows a front perspective view of the rack based surge suppression unit 40 previously shown in FIG. 1. The surge suppression unit 40 includes a frame 200 that connects to a rack or support structure 25 such as the same one used for supporting the DC power plant 28 shown in FIG. 1. The rear end of the frame 200 supports a power terminal assembly 202 and a front end of the frame 200 supports a surge suppression tray 204. The front of the surge suppression unit 40 includes a series of light emitting diodes (LEDs) 207 that are activated based on the operational state of surge suppression devices contained in the tray 204.

Mounting brackets 224 attach at the front, back, or middle sides of the frame 200 and attach at the rack or other support structure 25. For example, a first set of brackets may be used at a first location for a 19 inch rack and a second different set of brackets may be used at a second location for a 23 inch rack.

The surge suppression tray 204 has the advantage of having a conventional Rack Unit (RU) form factor that in one embodiment is a 2RU enclosure 209 that can fit into a 19 inch or 23 inch rack configuration. This allows the surge suppression unit 40 to be mounted in the same rack 25 that holds the electronic circuitry for the power plant 28 and/or holds the telecommunication circuitry for the BTS 24 shown in FIG. 1. This allows the surge suppression unit 40 to be connected closer to the power plant 28 and telecommunication circuitry 24. The surge suppression unit 40 can be mounted onto any other rack or other structure that may be housed in the building 32 shown in FIG. 1, uses minimal space, and does not require a special mounting structure or rack.

Figure 12:
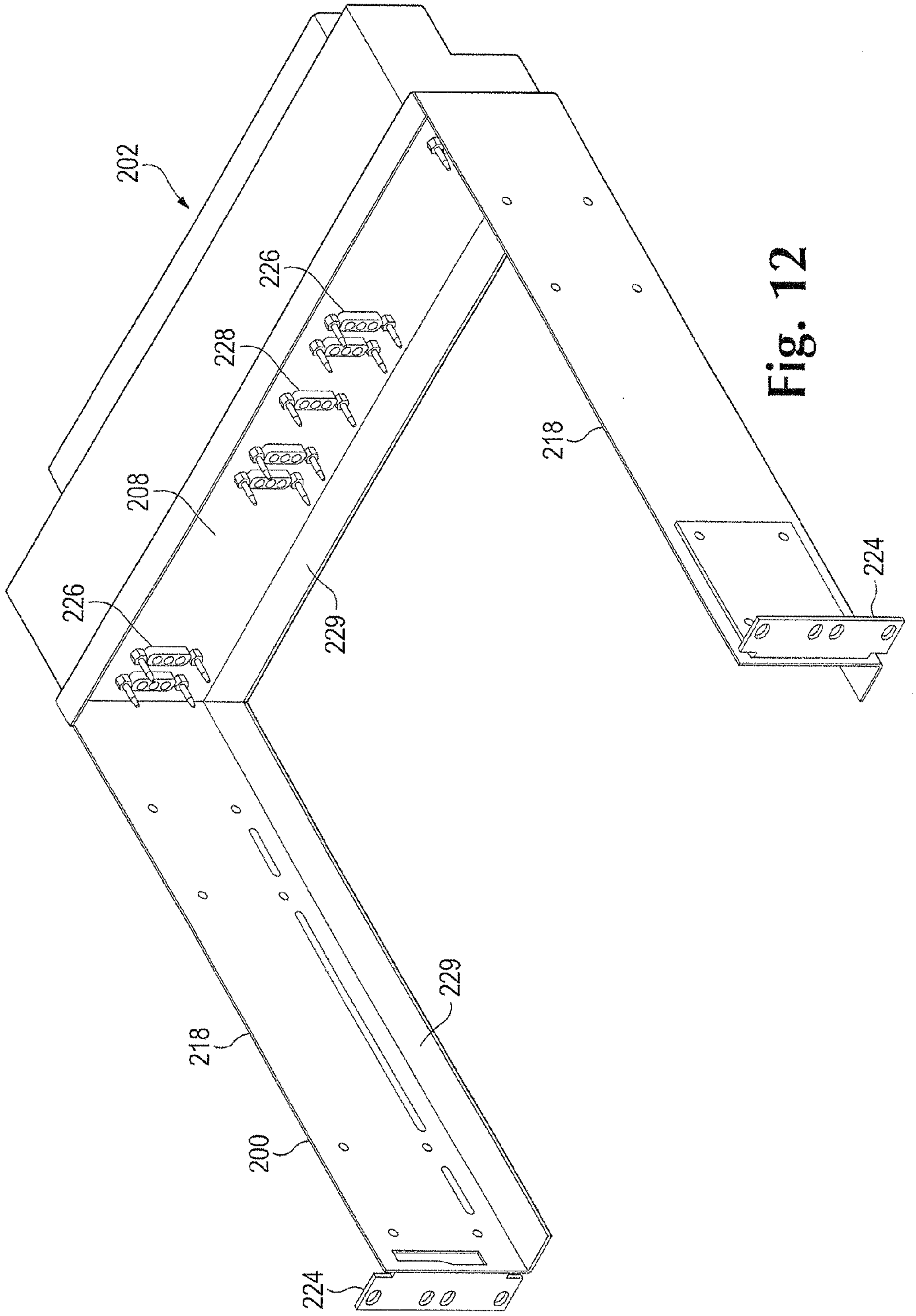
FIG. 12 shows a back end of the surge suppression unit shown in FIG. 11.

FIG. 12 is a perspective view of the frame 200 and power terminal assembly 202. The frame 200 includes side walls 218 that are connected together at a back end by a back wall 208. Bottom ends of walls 208 and 218 extend horizontally inward forming a ledge 229 that supports the tray 204 in FIG. 11. The back wall 208 includes openings for receiving connectors 226 and 228 that extend out from the power terminal assembly 202.

Figure 13:
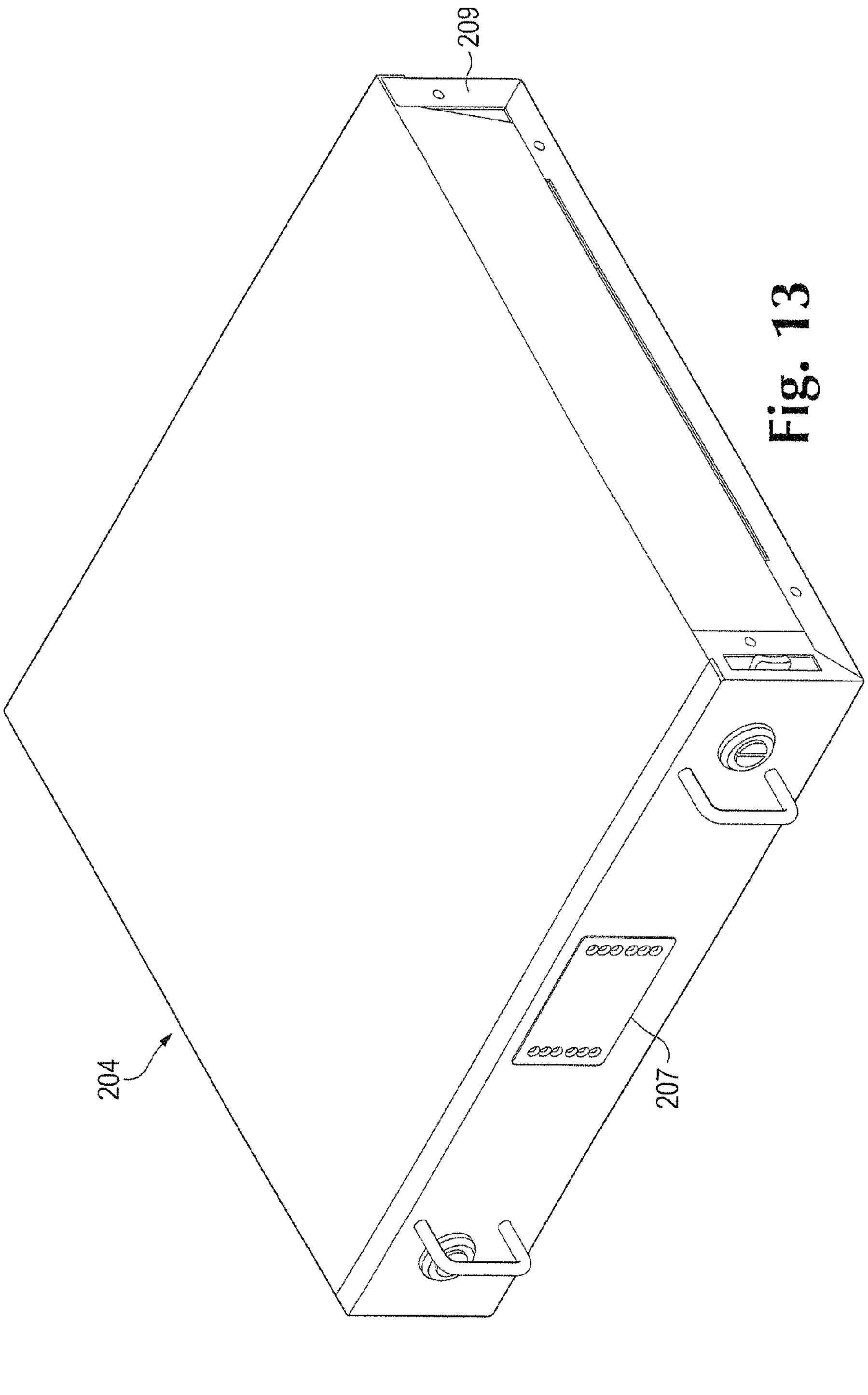
FIG. 13 shows a surge suppression tray for the surge suppression unit shown in FIG. 11.

FIG. 13 is a perspective isolated view of the surge suppression tray 204. The tray 204 contains surge suppression modules 260 (FIG. 18) that provide surge suppression for the electrical equipment located in the structure 32 in FIG. 1. The tray 204 has a rectangular shaped enclosure 209 that slides into, and is supported by, the frame 200 in FIG. 12.

Figure 14:
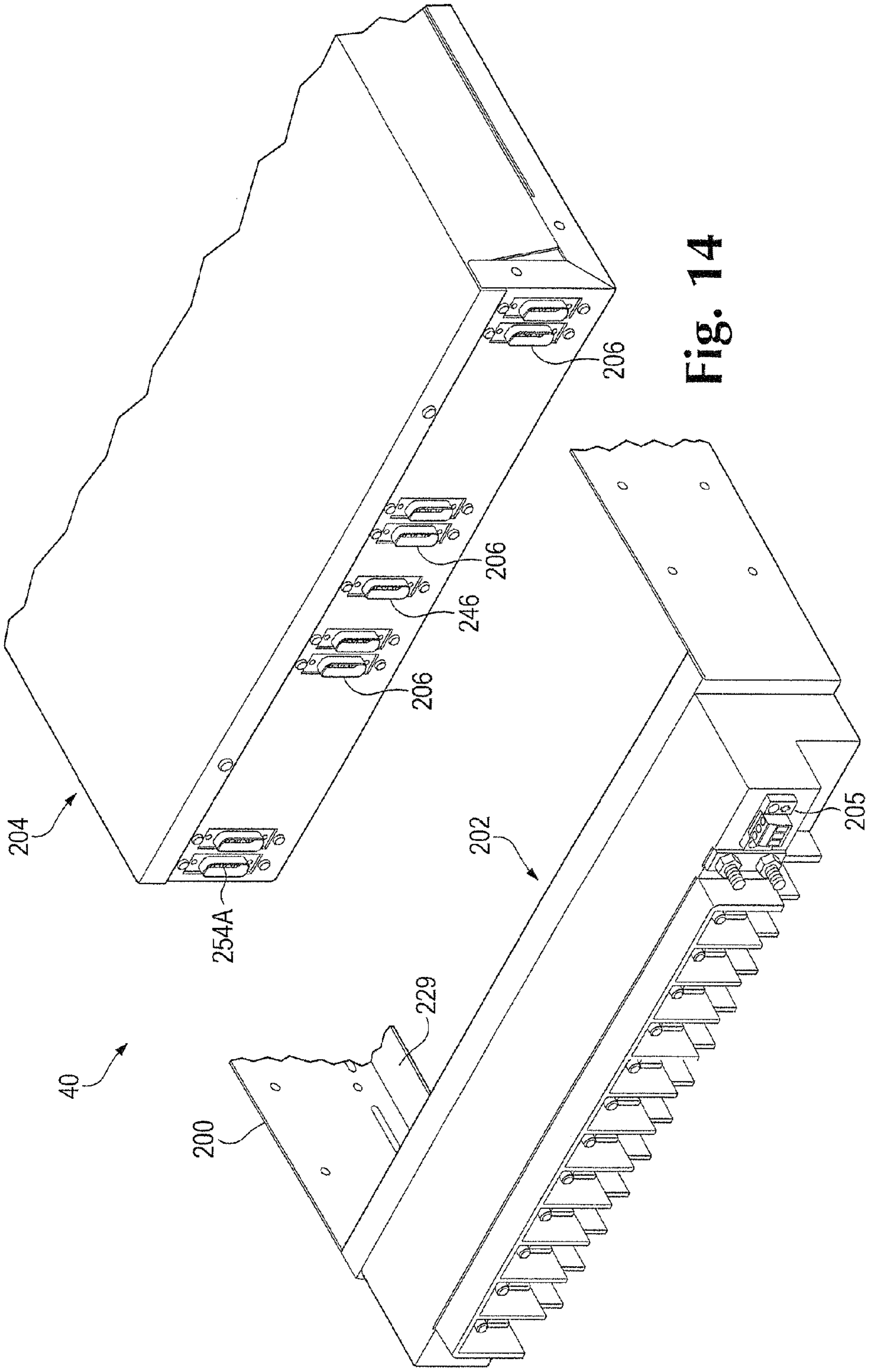
FIG. 14 shows how a power terminal assembly in the surge suppression unit is connected to the surge suppression tray.

FIG. 14 is a partial perspective rear view of the rack mountable surge suppression unit 40. The tray 204 is shown detached in a spaced apart position with respect to the power terminal assembly 202. In an operational position, the back of tray 204 is slid back against the power terminal assembly 202. The blind mate connectors 206 and 246 on the back end of tray 204 slidingly insert into mating connectors 226 and 228 in FIG. 12 that extend out of the front end of power terminal assembly 202.

The power terminal assembly 202 provides a common in-line connectivity point for the surge suppression modules 260 contained in the tray 204. This unique in-line connectivity also allows the tray 204 and internal surge suppression devices to be detached from power lines 20 while the power lines are energized without disrupting operation of the radios 18 in FIG. 1 (hot swappable). Multiple surge suppression units can be removed, replaced, and reattached from the power lines 20 all at the same time simply by connecting or disconnecting tray 204 to or from power terminal assembly 202.

Figure 15:
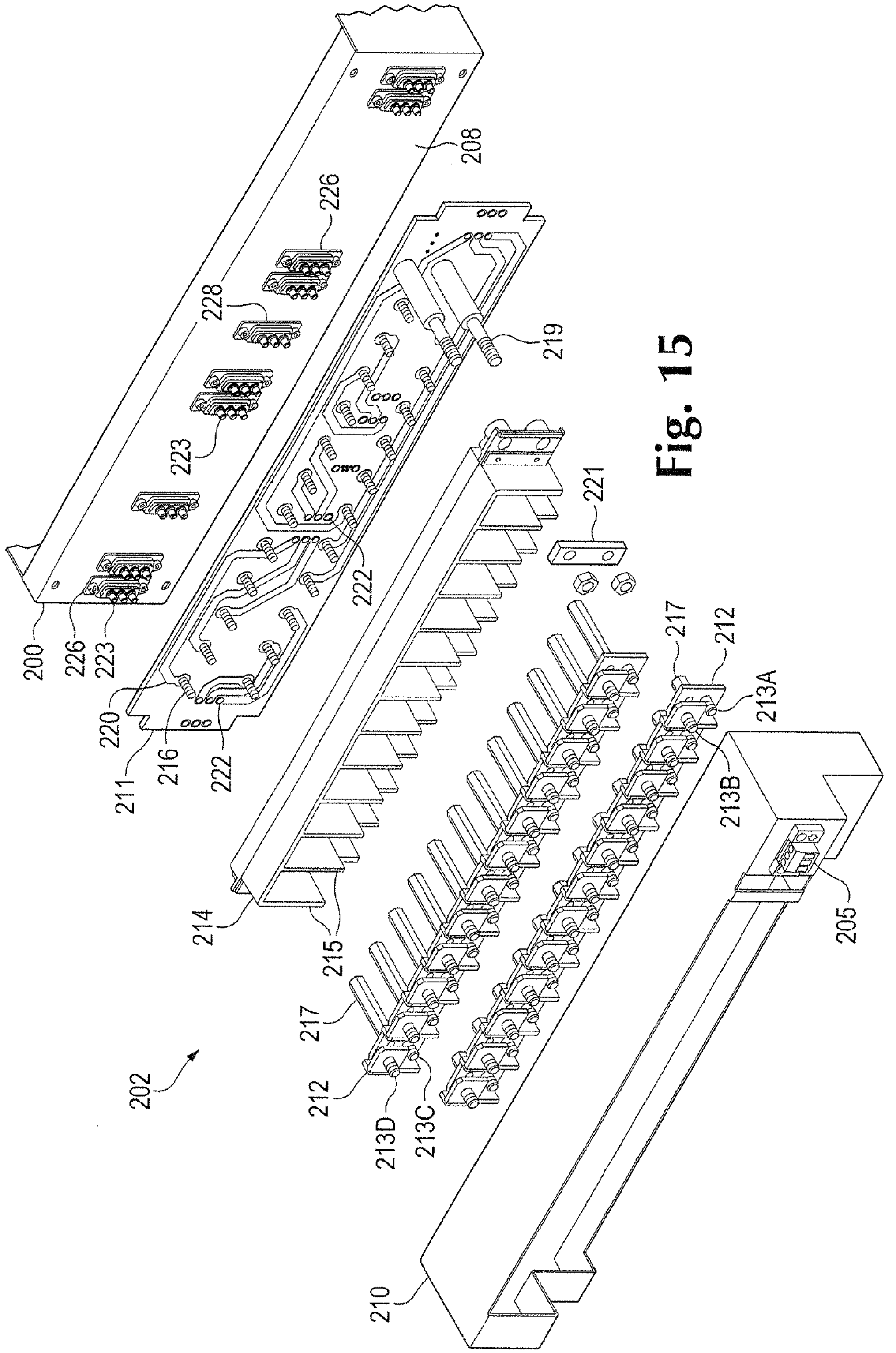
FIG. 15 shows an exploded view of the power terminal assembly.

FIG. 15 is an exploded perspective view of the power terminal assembly 202. A housing 210 receives upper and lower connector strips 212 that are shown in more detail below. Terminals 213 extend out from a back end of the connector strips 212. Pairs of upper and immediately lower terminals 213A, 213B and 213C, 213D are shorted together. Insulator blocks 214 include walls 215 that align between the vertical pairs of terminals 213.

Connector rods 217 connect the terminal pairs 213A, 213B and 213C, 213D to threaded pins or screws 216 that extend out of a circuit board 211. Etched conductors 220 connect the pins or screws 216 to contact holes 222 that extend through the circuit board 211. The contact holes 222 receive and connect to pins or sockets 223 contained in the connectors 226 and 228 that extend out the back wall 208 of frame 200. A ground rod 219 is attached at one end to a ground plane of the circuit board 211, extends through the insulator blocks 214, and connects to a ground terminal 221. Alarm socket 205 connects to monitoring circuits 280 shown below and extends out the back face of housing 210.

Figure 16:
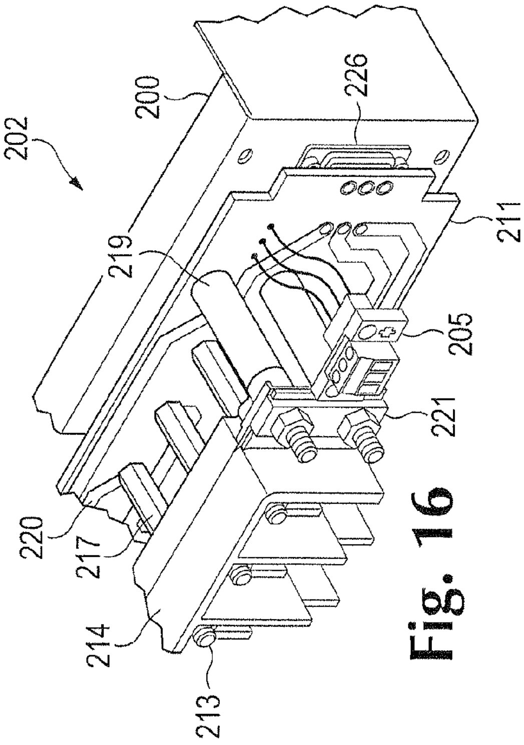
FIG. 16 shows an assembled partial view of the power terminal assembly.

FIG. 16 shows a partial assembled view of the power terminal assembly 202. The ground rod 219 provides a ground connection from ground terminal 221 to a ground plane on the circuit board 211. The connector rods 217 provide separate power connections from different pairs of shorted terminals 213A, 213B and 213C, 213D to different pins or screws 216 on the circuit board 211. The etched conductors 220 on the circuit board 211 electrically connect the pins or screws 216 to the contact holes 222. The contact holes 222 then electrically connect to corresponding sockets or pins 223 in connectors 226 and 228 (FIG. 15).

Figure 17:
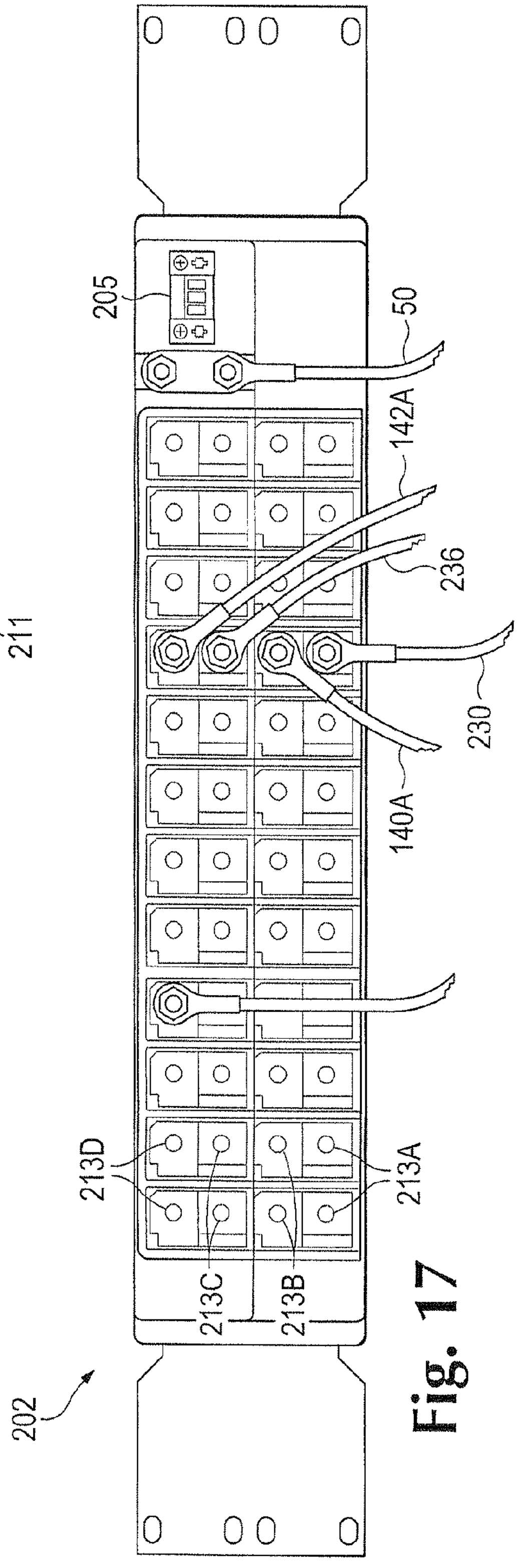
FIG. 17 is a rear elevation view of the power terminal assembly.

FIG. 17 shows a rear elevation view of the power terminal assembly 202. A first lower row of terminals 213A connect to different −48 v power line jumpers 230 connected to the power plant 28 in FIG. 1. A second row of terminals 213B are shorted to immediately lower terminals 213A in the first row and connect to one of the −48 v power lines 140A in power cable 20 that connect to the external surge suppression unit 30 in FIG. 1.

A third row of terminals 213C connect to the different −48 v power return jumper lines 236 that connect to the power plant 28 shown in FIG. 1. A fourth row of terminals 213D are shorted to the immediately lower terminal 213C in the third row. The terminals 213D connect to associated −48*v* return/positive power lines 142A in one of the power cables 20 that connect to the surge suppression unit 30 in FIG. 1.

Each lower row of terminals 213A, 213B, 213C, and 213D is set back from the immediately upper row. This allows a relatively large number of power terminals 213 to extend out the back end of the relatively short height of a 2RU frame 200.

Each separate vertical column of terminals 213A, 213B, 213C, and 213D is associated with the power cable 20 connected to a different radio 18 in FIG. 1. There are 12 terminal sets 213A-D that extend out the back of the terminal assembly 202 that can each connect to a different power cable 20 for powering a different one of the radios 18. For example, the first terminal set 213A-213D on the far left may be associated with a first power cable 20 that is connected to a first radio 18.

For effective surge suppression protection, surge suppression devices should be located relatively close to the protected electrical circuitry. The rack mountable power terminal assembly 202 provides a common connection location for the surge suppression devices to connect to different power lines and allows surge suppression devices to be closely mounted on the same rack 25 in FIG. 11 that contains DC power plant 28 and/or communication station 24. As also explained above, detachably connecting the tray 204 in FIG. 13 to the power terminal assembly 202 also allows the surge suppression modules in the tray 204 to be more easily connected and disconnected from different power lines.

The terminal assembly 202 provides unique "in-line" connectivity between the power lines 140A, 142A, 230, and 236 and the surge suppression modules in tray 204. The power lines 230 and 236 come into the terminal assembly 202 from the DC power plant 28. The power lines 140A and 142A go out from the terminal assembly 202 through the power cables 20 to the radios 18. This allows the surge suppression devices in tray 204 to receive power from the power lines 230 and 236 before the power is directed out through power lines 140A and 142A to the radios 18. This in-line feature prevents having to use "T" wiring configurations that are separately run from the power cables to the surge suppression devices. The in-line feature provides controlled, consistent, repeatable, and relatively close connectivity between the surge suppression devices in tray 204 and the DC power supply 28.

Figure 18:
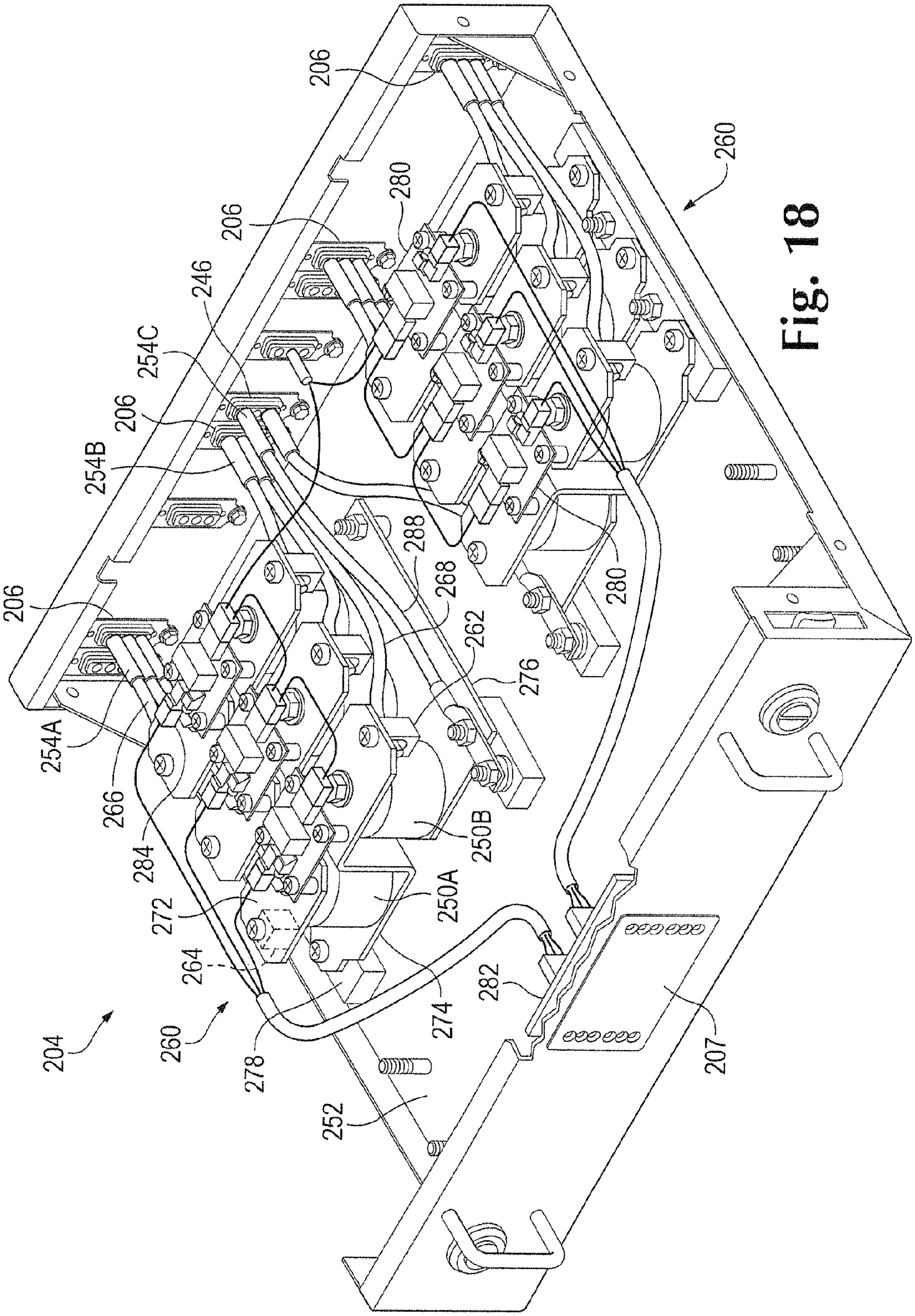
FIG. 18 is a perspective view of the surge suppression tray with a top hood removed.

FIG. 18 shows a front perspective view of the rack mountable tray 204 with a top hood removed. A bottom floor 252 holds two surge suppression modules 260 alternatively referred to as "six packs." The two surge suppression modules 260 each include three pairs of surge suppression devices 250A and 250B. In other configurations each module 260 could have more or fewer than three pairs of surge suppression devices 250. In one embodiment, the surge suppression devices 250 are the same as the surge suppression devices 100 used in the surge suppression unit 30 described above. However, other types of surge suppression devices can also be used.

The modules 260 are screwed down to the bottom floor 252 of tray 204. A first cable 266 has a first end connected to a terminal 264 and a second end that includes a pin or socket 254A that snaps into one of the connectors 206 that extend out the back of tray 204. A second cable 268 is connected at a first end to a terminal 262 and connected at a second end to a pin or socket 254B that inserts into another one of the connectors 206 that extend out the back of tray 204. The terminal 262 connects to a bus bar 274 that has a first portion that extends over a top end of surge suppression device 250B, a second portion that extends vertically up between surge suppression devices 250A and 250B, and a third section that connects to a bottom end of surge suppression device 250A.

Similar cables 266 and 268 are connected to the other pairs of surge suppression devices 250A and 250B that are contained within the same suppression module 260. A first end of a ground cable 288 connects to a ground bus bar 276. A second end of ground cable 288 includes a socket or pin 254C that snaps into the push connector 246 that extends out of the back end of the tray 204.

The blind mate in-line push connectors 206 extend out of a back end of the tray 204 and the pins or sockets 254 insert into or receive the blind mate in-line push connectors 226 that extend out from the back wall of the frame 200 as shown in FIG. 12. The blind mate in-line push connector 246 extends out of the back end of the tray 204 and connects with the blind mate in-line connector 228 that extends out the back wall of the frame 200 in FIG. 12. The connectors 206 and 246 can be easily modified with additional pins or sockets when additional surge suppression modules 260 are added to tray 204. Other types of connectors that allow easy attachment and detachment between the power terminal assembly 202 and tray 204 can also be used.

Only two surge suppression modules 260 are shown in FIG. 18. However the tray 204 can be quickly upgraded to add one or two more additional surge suppression modules 260 and provide surge suppression for an additional three or six power cables 20. The connectors 206 can receive the cables 266 and 268 for four different surge suppression modules 260. Each module 260 includes three pairs of surge suppression devices 250A and 250B that provide surge suppression for three different power cables. Thus, the tray 204 can provide surge suppression for twelve different power cables 20. Because the surge suppression devices 250 are configured in modules 260, six different surge suppression devices 250 (3 different pairs) can be removed or added to the tray 204 at the same time.

When the tray 204 is inserted into frame 200, the connectors 206 and 246 align and mate with the connectors 226 and 228, respectively, that extend out the back wall of frame 200 (FIG. 12). Thus, all of the surge suppression modules 260 and associated surge suppression devices 250A and 250B that are contained in tray 204 are connected to multiple different power lines all at the same time simply by plugging tray 204 into the power terminal assembly 202.

The monitoring circuits 280 are mounted between a bus bar 272 and bus bar 274 and connect to the top of each pair of surge suppression devices 250A and 250B. The monitoring circuits 280 are connected via clips 284 to a panel 282 that contains the LEDs 207 that extend out the front of tray 204 and identify the operational state for different pairs of surge suppression devices 250A and 250B.

The LEDs 207 on the front face of the tray 204 are activated when the surge suppression modules 260 are in a powered and operational state. Sets of three radios may be associated with a same frequency. Sets of three LEDs 207 can be associated with the three pairs of surge suppression devices connected to the three power cables 20 powering the three radios having the same frequency. Of course other LED and frequency configurations could also be used.

Figure 19:
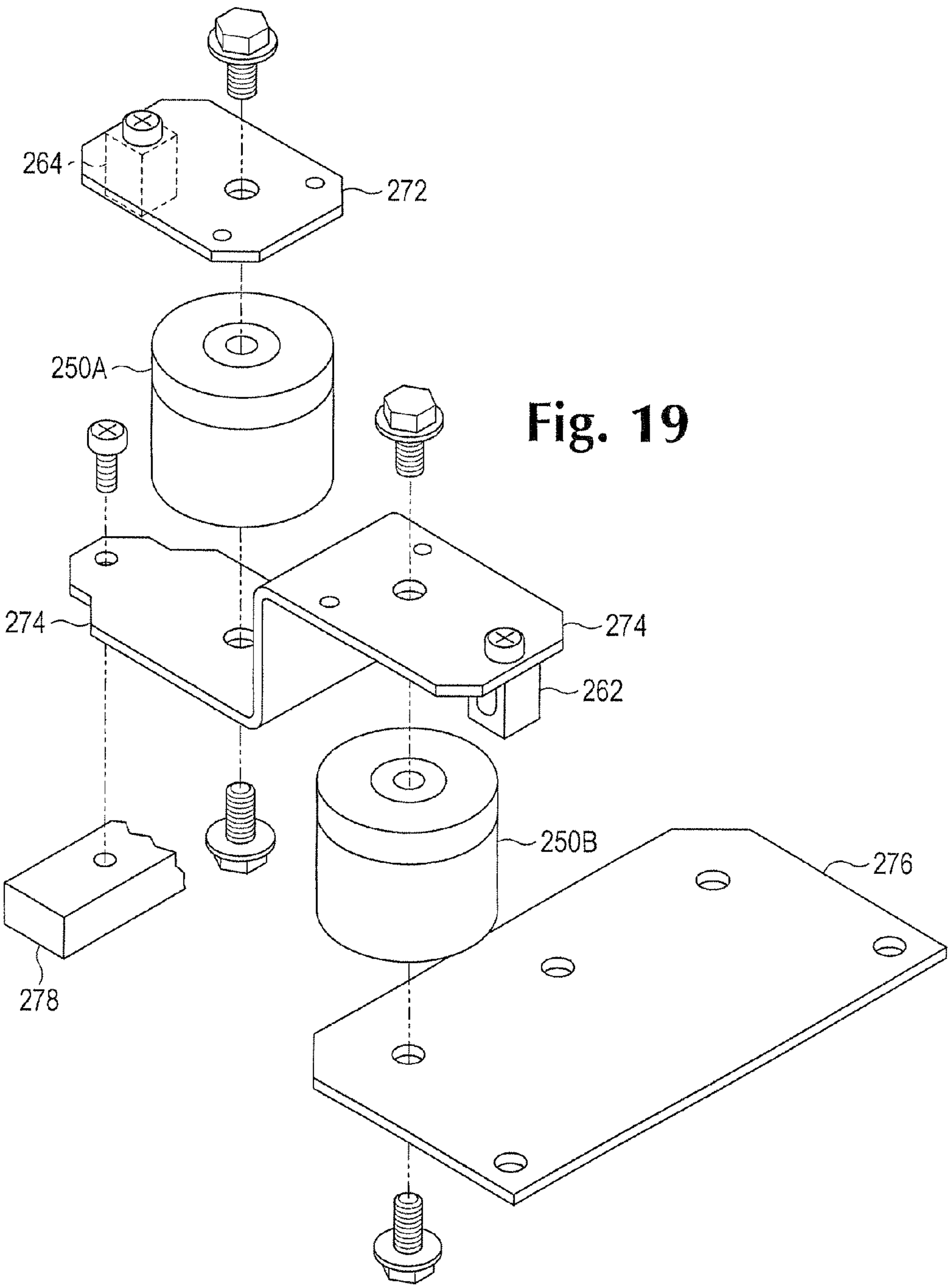
FIG. 19 is an exploded partial view of a surge suppression module located in the surge suppression tray.

FIG. 19 shows an exploded perspective view for one pair of surge suppression devices 250A and 250B in one of the surge suppression modules 260. The first bus bar 272 connects terminal 264 and one of the **−48*v* power lines 266 to the top end of surge suppression device 250A. The z-shaped second bus bar 274 connects horizontally to the bottom end of surge suppression device 250A, extends vertically up between surge suppression devices 250A and 250B, and then extends and connects horizontally to a top end of surge suppression device 250B. The second bus bar 274 also connects to one of the return power lines 268 in FIG. 18 through terminal 262. The ground bus bar 276 is connected to the bottom end of surge suppression device 250B and mechanically holds together the three pairs of surge suppression devices in the surge suppression module 260. A mounting bar 278 attaches to the bottom of bus bar 274 and also holds the three pairs of surge suppression devices 250 in the module 260** together.

Figure 20:
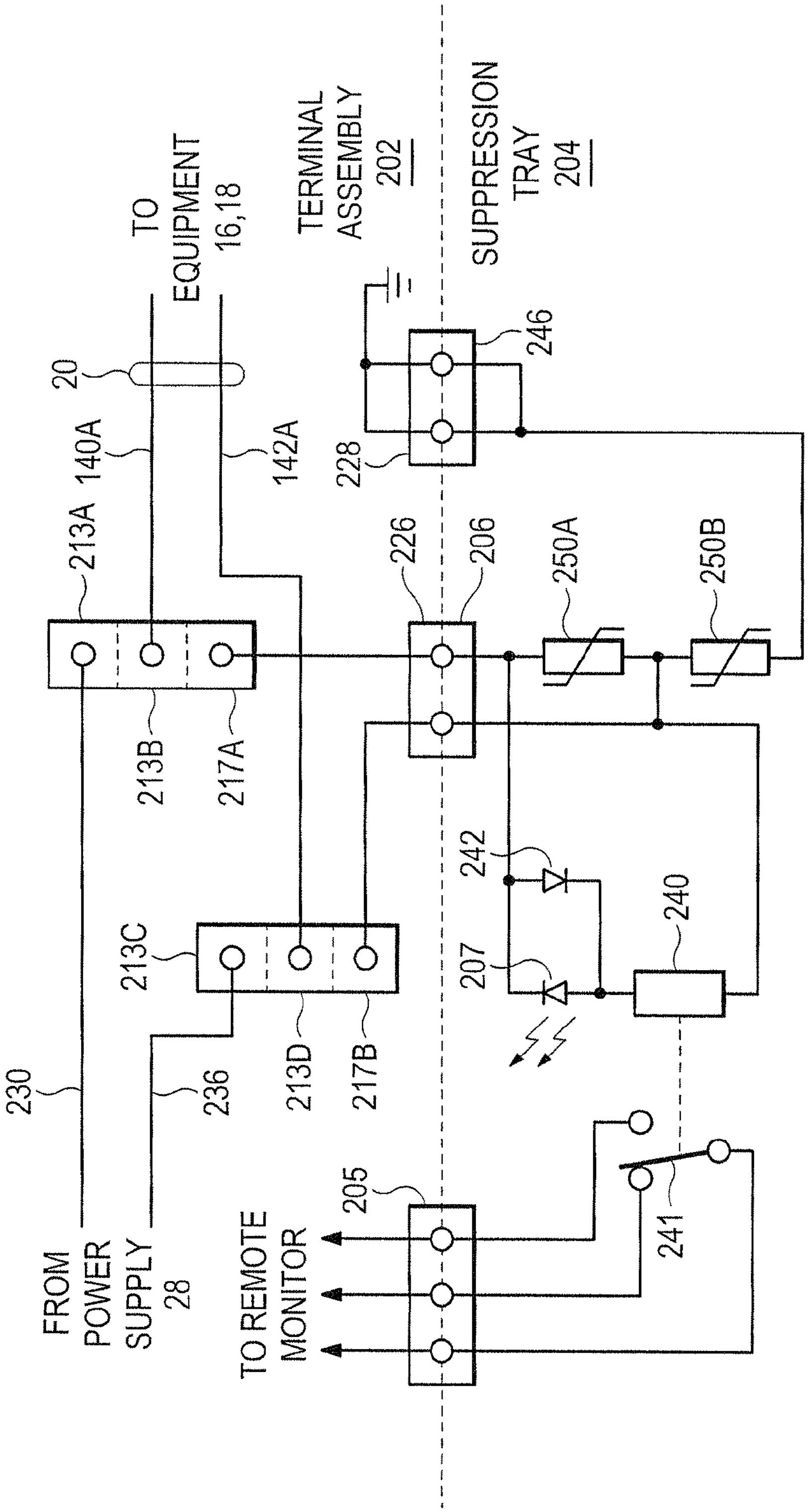
FIG. 20 is a schematic diagram for the surge suppression modules of FIG. 19.

FIG. 20 is a schematic diagram that shows in more detail how the different components in the surge suppression unit 40 are connected together. FIG. 20 shows surge suppression circuitry and mechanical connections for one pair of surge suppression devices for connecting to one power cable 20. However, any number of surge suppression devices 250 and corresponding surge suppression circuits similar to that shown in FIG. 20 can be contained in tray 204.

The power lines 230 and 140A connect to the terminals 213A and 213B, respectively. As mentioned above, the two terminals 213A and 213B are shorted together. A connector rod 217A connects a back end of the terminal pair 213A and 213B to a pin or socket in one of the connectors 226 that extends out from the back wall of frame 200. The power lines 236 and 142A connect to terminals 213C and 213D, respectively. A second connector rod 217B connects the back of the terminals 213C and 213D to another socket or pin in one of the connectors 226.

A first end of the surge suppression device 250A connects to the −48 v power line from connector rod 217A. A second end of surge suppression device 250A connects to a first end of the second surge suppression device 250B, the return voltage from connector rod 217B, and one end of a relay 240. A second end of suppression device 250B connects to ground via the connectors 246 and 228. A second end of the relay 240 connects back to the −48 voltage line through one of the LEDs 207 and a rectifier 242. The relay 240 includes a switch in a first state. The LED 207 is activated when the circuit is powered by the power lines and the surge suppression device 250A is in a normal open operating state. The relay switch 241 is daisy chained with the relays from the other surge suppression monitoring circuits 280 connected to other surge suppression circuits. The relay 240, switch 241, and other alarm circuitry 207 and 242 are located on the alarm board 280 in FIG. 18.

When the surge suppression device 250A fails to a short-circuit condition or power is removed from the circuit, the relay switch 241 switches to a second state causing connections on alarm socket 205 to open or disconnect a circuit that indicates a failure condition. The surge suppression unit 30 shown above in FIGS. 1-10 may have similar surge suppression circuitry as shown in FIG. 20. However, other electrical circuit configurations could also be used.

Several preferred examples have been described above with reference to the accompanying drawings and pictures. Various other examples of the invention are also possible and practical. The system may be exemplified in many different forms and should not be construed as being limited to the examples set forth above.

The figures listed above illustrate preferred examples of the application and the operation of such examples. In the figures, the size of the boxes is not intended to represent the size of the various physical components. Where the same element appears in multiple figures, the same reference numeral is used to denote the element in all of the figures where it appears.

Only those parts of the various units are shown and described which are necessary to convey an understanding of the examples to those skilled in the art. Those parts and elements not shown may be conventional and known in the art.

The system described above can use dedicated processor systems, micro controllers, programmable logic devices, or microprocessors that perfoi in some or all of the operations, all of which can be referred to as circuitry herein. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features can be implemented by themselves, or in combination with other operations in either hardware or software.

Having described and illustrated the principles of the invention in a preferred embodiment thereof, it should be apparent that the invention may be modified in arrangement and detail without departing from such principles. We claim all modifications and variation coming within the spirit and scope of the following claims.

The invention claimed is:

1. A surge suppression unit, comprising:

a power terminal assembly comprising terminals configured to connect to a first set of power cables connected to a power supply and connect to a second set of power cables connected to remote radios;

a connector strip attached to the power terminal assembly comprising multiple shorted together terminal pairs, wherein a first one of the terminal pairs is configured to connect to one of the first set of power cables and a second one of the terminal pairs is configured to connect to one of the second set of power cables; and a surge suppression tray configured to retain surge suppression modules and connect the surge suppression modules to the terminals responsive to the surge suppression tray attaching to the power terminal assembly.

2. The surge suppression unit of claim 1 further comprising:

a first set of connectors coupled to the terminals and extending out of the power terminal assembly; and a second set of connectors coupled to the surge suppression modules and extending out of the surge suppression tray, wherein the first set of connectors are configured to attach to the second set of connectors responsive to a back end of the surge suppression tray attaching to a front end of the power terminal assembly.

3. The surge suppression unit of claim 2 wherein the first and second set of connectors comprise in-line socket and pin connectors.

4. The surge suppression unit of claim 1 further comprising a frame including a back wall configured to attach to the power terminal assembly and side walls for detachably receiving the surge suppression tray.

5. The surge suppression unit of claim 4 wherein:

the frame further comprises a shelf extending in from a bottom end of the side walls and a bottom end of the back wall; and the surge suppression tray comprises an enclosure configured to insert in between the sides walls and sit on the shelf.

6. The surge suppression unit of claim 5 wherein the enclosure has a Rack Unit (RU) form factor.

7. The surge suppression unit of claim 5 wherein the enclosure is further configured to slidingly insert in-between the side walls of the frame toward the back wall until a first set of connectors extending out of back end of the enclosure mate with a second set of connectors extending out of the back wall of the frame.

8. The surge suppression unit of claim 1 further comprising:

connector rods coupled to the terminal pairs;

a circuit board configured to connect to the connector rods and including connector holes coupled to the connector rods through etched conductors on the circuit board; and connectors coupled to the connector holes and extending out of the power terminal assembly.

9. The surge suppression unit of claim 1 wherein the surge suppression tray is hot swappable with the power terminal assembly.

10. A surge suppression unit, comprising:

an enclosure;

surge suppression modules located in the enclosure;

cables coupled at a first end to the surge suppression modules; and in-line connectors coupled to a second end of the cables and extending out of the enclosure, wherein the surge suppression modules further comprise:

a first bus bar coupled to a top end of a first surge suppression device and coupled through a first one of the cables to one of the in-line connectors;

a second bus bar coupled to a bottom end of the first surge suppression device and a top end of a second surge suppression device, wherein the second bus bar is further coupled through a second one of the cables to one of the in-line connectors and comprises a first horizontal section that extends below the first surge suppression device, a second vertical section that extends up between the first and second surge suppression device, and a third horizontal section that extends above the second surge suppression device; and a third bus bar coupled to a bottom end of the second surge suppression device and coupled through a third one of the cables to at least one of the in-line connectors.

11. The surge suppression unit of claim 10 wherein the enclosure has a Rack Unit (RU) form factor.

12. The surge suppression unit of claim 10 wherein the first bus bar, the second bus bar, and the third bus bar are coupled to pins or sockets in the in-line connectors.

13. The surge suppression unit of claim 10 further comprising:

a power terminal assembly comprising multiple shorted together terminal pairs, wherein a first one of the terminal pairs is configured to connect to a first power cable and a second one of the terminal pairs is configured to connect to a second power cable and short the first power cable with the second power cable; and multiple mating in-line connectors connected to different ones of the terminal pairs in the power terminal assembly and configured to interconnect with the in-line connectors extending out of the enclosure.

14. The surge suppression unit of claim 13 wherein the in-line connectors are configured to slidingly engage with the mating in-line connectors coupled to the terminal pairs.

15. A power terminal assembly, comprising:

a connector strip comprising multiple shorted together terminal pairs, wherein a first terminal on the terminal pairs is configured to connect to a first power cable connected to a power supply and a second terminal on the terminal pairs is configured to connect a second power cable connected to a telecommunication device; and in-line connectors coupled to the terminal pairs, wherein the in-line connectors are configured to connect to mating connectors coupled to surge suppression devices.

16. The power terminal assembly of claim 15 further comprising:

an etched circuit board;

connector holes extending through the circuit board; and etched conductors coupling the connector holes to the in-line connectors.

17. The power terminal assembly of claim 16 further comprising connector rods coupled at a first end to the terminal pairs and coupled at a second end to the circuit board.

18. The power terminal assembly of claim 15 further comprising an additional connector strip offset from the connector strip and comprising additional terminal pairs that are shorted together, wherein a first terminal of the additional terminal pairs is configured to connect to a first return power cable connected to the power supply and a second terminal of the additional terminal pairs is configured to connect a second return power cable connected to the telecommunication device.

* * * * *